United States Patent
Kim et al.

(10) Patent No.: US 11,166,279 B2
(45) Date of Patent: *Nov. 2, 2021

(54) DEVICE AND METHOD FOR TRANSMITTING AND RECEIVING DISCOVERY SIGNAL OF BASE STATION IN MOBILE COMMUNICATION SYSTEM

(71) Applicant: Samsung Electronics Co., Ltd., Suwon-si (KR)

(72) Inventors: Jae-Won Kim, Seoul (KR); Hyun-Kyu Yu, Suwon-si (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,120

(22) Filed: Dec. 6, 2019

(65) Prior Publication Data

US 2020/0154435 A1    May 14, 2020

Related U.S. Application Data

(63) Continuation of application No. 14/908,418, filed as application No. PCT/KR2014/006928 on Jul. 29, 2014, now Pat. No. 10,506,590.

(30) Foreign Application Priority Data

Jul. 30, 2013    (KR) ........................ 10-2013-0090180

(51) Int. Cl.
*H04W 72/04*    (2009.01)
*H04W 48/16*    (2009.01)
(Continued)

(52) U.S. Cl.
CPC ....... *H04W 72/0453* (2013.01); *H04L 5/0048* (2013.01); *H04W 16/32* (2013.01);
(Continued)

(58) Field of Classification Search
CPC ...... H04L 5/0091–0098; H04W 8/005; H04W 92/20; H04W 72/0426; H04W 72/1215;
(Continued)

(56) References Cited

U.S. PATENT DOCUMENTS

2009/0252073 A1    10/2009  Kim et al.
2010/0210273 A1    8/2010   Jun et al.
(Continued)

FOREIGN PATENT DOCUMENTS

EP    2 568 740 A1    3/2013
JP    2012-231343 A    11/2012
(Continued)

OTHER PUBLICATIONS

NTT Docomo, Enhanced Coordination Aspects for Small Cell Enhancement, 3GPP TSG RAN WG1 Meeting #72, R1-130408, Jan. 28, 2013, St Julian's, Malta.
(Continued)

*Primary Examiner* — Marcus Smith
(74) *Attorney, Agent, or Firm* — Jefferson IP Law, LLP

(57) ABSTRACT

A method by which a small base station (BS) transmits a discovery signal (DS) in a mobile communication system is provided. The method includes a macro BS to which a component carrier (CC) of a predetermined frequency band is allocated, and at least one small base station to which N number of CCs of a frequency band different from that of the CC allocated to the macro base station are allocated. The method comprises the steps of generating the DS corresponding to predetermined information and transmitting the generated DS through a discovery channel (DCH) config-
(Continued)

ured as a transmission resource of the macro base station, wherein the predetermined information is one among information on at least one CC that the small base station uses, cell ID (CID) index information of the small base station, and a sleep base station index when the small base station is in a sleep mode.

16 Claims, 11 Drawing Sheets

(51) Int. Cl.
| | |
|---|---|
| *H04W 52/02* | (2009.01) |
| *H04L 5/00* | (2006.01) |
| *H04W 8/00* | (2009.01) |
| *H04W 16/32* | (2009.01) |
| *H04W 48/12* | (2009.01) |
| *H04W 88/02* | (2009.01) |
| *H04W 88/08* | (2009.01) |

(52) U.S. Cl.
CPC ........... *H04W 48/12* (2013.01); *H04W 48/16* (2013.01); *H04W 52/0206* (2013.01); *H04W 8/005* (2013.01); *H04W 88/02* (2013.01); *H04W 88/08* (2013.01); *Y02D 30/70* (2020.08)

(58) Field of Classification Search
CPC ......... H04W 76/15–16; H04W 84/045; H04W 48/16–20
See application file for complete search history.

(56) References Cited

U.S. PATENT DOCUMENTS

| | | | |
|---|---|---|---|
| 2011/0105141 A1* | 5/2011 | Jung | H04W 68/00 455/453 |
| 2011/0261777 A1 | 10/2011 | Maeda et al. | |
| 2012/0093021 A1 | 4/2012 | Kim et al. | |
| 2012/0094663 A1 | 4/2012 | Awoniyi et al. | |
| 2013/0021996 A1* | 1/2013 | Wang | H04W 72/082 370/329 |
| 2013/0039268 A1 | 2/2013 | Blankenship et al. | |
| 2013/0051264 A1 | 2/2013 | Wang et al. | |
| 2013/0114438 A1 | 5/2013 | Bhattad et al. | |
| 2013/0122822 A1 | 5/2013 | Srinivasan et al. | |
| 2014/0038598 A1 | 2/2014 | Ren et al. | |
| 2014/0050184 A1* | 2/2014 | Yamazaki | H04L 5/001 370/329 |
| 2014/0269464 A1* | 9/2014 | Park | H04W 52/0274 370/311 |
| 2015/0004969 A1* | 1/2015 | Han | H04L 5/22 455/434 |
| 2015/0029955 A1* | 1/2015 | Heo | H04B 7/0695 370/329 |
| 2015/0215852 A1 | 7/2015 | Gou et al. | |
| 2015/0271743 A1* | 9/2015 | Teng | H04W 48/16 455/452.1 |
| 2015/0373628 A1 | 12/2015 | Hwang et al. | |
| 2015/0382299 A1 | 12/2015 | Zeng et al. | |
| 2016/0050617 A1* | 2/2016 | Hwang | H04L 5/0053 455/434 |
| 2016/0095077 A1 | 3/2016 | Kwak et al. | |

FOREIGN PATENT DOCUMENTS

| | | |
|---|---|---|
| WO | 2013/040487 A1 | 3/2013 |
| WO | 2013/096928 A1 | 6/2013 |
| WO | 2014/165614 A2 | 10/2014 |

OTHER PUBLICATIONS

Qualcomm Incorporated, Mechanisms for efficient small cell operation, 3GPP TSG RAN WG1 Meeting #72, R1-130595, Jan. 28, 2013, St Julian's, Malta.

NTT Docomo et al., Scenario and Migration for Small Cell Enhancement, 3GPP TSG RAN WG1 Meeting #72, R1-130659, Jan. 28, 2013, St Julian's, Malta.

Fujitsu; Consideration on efficient discovery of small cell; 3GPP TSG RAN WG1 Meeting #72bis; R1-131100; Apr. 15-19, 2013; Chicago, IL.

Panasonic; Discussion on small cell discovery issues; 3GPP TSG RAN WG1 Meeting #73; R1-132142; May 20-24, 2013; Fukuoka, Japan.

Interdigital; Discovery of small cells; 3GPP TSG-RAN WG1 Meeting #73; R1-132182; May 20-24, 2013; Fukuoka, Japan.

ITRI, "Inter-frequency Small Cell Detection", 3GPP TSG-RAN WG2 Meeting#79, R2-123622, Aug. 13-17, 2012, Qingdao, P.R. China.

ZTE, "Small Cell Discovery Signal—Efficient Operation of Small Cells", 3GPP TSG-RAN WG1 Meeting #74bis, R1-134325, Oct. 7-11, 2013, Guangzhou, China.

NTT Docomo, "Views on Enhanced Small Cell Discovery", 3GPP TSG RAN WG1 Meeting #72bis, R1-131425, pp. 1-2, Apr. 15-19, 2013, Chicago, USA.

Korean Office Action dated Nov. 29, 2020, issued in Korean Application No. 10-2014-0096474.

\* cited by examiner

DEVICE AND METHOD FOR TRANSMITTING AND RECEIVING DISCOVERY SIGNAL OF BASE STATION IN MOBILE COMMUNICATION SYSTEM

CROSS-REFERENCE TO RELATED APPLICATION(S)

This application is a continuation application of prior application Ser. No. 14/908,418, filed on Jan. 28, 2016, which has issued as U.S. Pat. No. 10,506,590 on Dec. 10, 2019, which was a U.S. National Stage application under 35 U.S.C. § 371 of an International application filed on Jul. 29, 2014 and assigned application number PCT/KR2014/006928, which claimed the benefit of a Korean patent application filed on Jul. 30, 2013 in the Korean Intellectual Property Office and assigned Serial number 10-2013-0090180, the entire disclosure of which is hereby incorporated by reference.

TECHNICAL FIELD

The present disclosure relates to cell searching of a user equipment (UE) in a mobile communication system. More particularly, the present disclosure relates to a method and apparatus for a small base station (BS) to transmit a discovery signal, and for a UE to receive the discovery signal, in a mobile communication system in which a macro BS and a small BS use component carriers of different frequency bands.

BACKGROUND

To address the shortage of frequency capacity, which is caused by the tendency of high capacity and high-speed communication in a cellular mobile communication system, a method of additionally installing a small cell in an existing macro cell coverage has been discussed.

In this instance, to minimize the effect of interference to an existing system that mainly uses a macro cell, a separate frequency band scheme may be used, in which a macro cell base station (BS) may use, for example, a frequency of 2 GHz which is a relatively lower band, and a small cell BS may use, for example, a frequency of 3.5 GHz which is a relatively higher band. In the separate frequency band scheme, high band frequency resources may include a larger number of dormant frequency resources than low band frequency resources. Therefore, the separate frequency band scheme is advantageous in that the system capacity may be dramatically improved by utilizing carrier aggregation (CA) technology that uses multiple component carriers. For reference, the CA technology, which is introduced by 3rd generation partnership project (3GPP) Release 10, is to increase a transmission speed by simultaneously utilizing a plurality of carriers.

Other aspects, advantages, and salient features of the disclosure will become apparent to those skilled in the art from the following detailed description, which, taken in conjunction with the annexed drawings, discloses various embodiments of the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for a user equipment (UE) to search for a small base station (BS) in a mobile communication system.

Another aspect of the present disclosure is to provide a method and apparatus for a small BS to provide a UE with information associated with a component carrier (CC) that the small BS uses in a mobile communication system.

Another aspect of the present disclosure is to provide a method and apparatus for a small BS that operates in a dormant mode to inform a UE of the existence of the small BS itself in a mobile communication system.

Another aspect of the present disclosure is to provide a method and apparatus for a macro BS to manage a dormant mode index for a small BS that operates in a dormant mode in a mobile communication system.

Another aspect of the present disclosure is to provide a method and apparatus for a small BS to provide a UE with a cell ID (CID) configuration information index of the small BS in a mobile communication system.

In accordance with an aspect of the present disclosure, a method for a small BS to transmit a discovery signal (DS) in a mobile communication system that includes a macro BS to which a component carrier (CC) of a predetermined frequency band is assigned, and at least one small BS to which N CCs are assigned, of which a frequency band is different from the CC assigned to the macro BS, is provided. The method includes generating a DS corresponding to predetermined information, and transmitting the generated DS through a discovery channel (DCH) that is formed of transmission resources of the macro BS, wherein the predetermined information is one of at least one CC information used by the small BS, a CID configuration information index of the small BS, and a dormant BS index when the small BS is in a dormant mode.

In accordance with another aspect of the present disclosure, a method for a UE to receive a DS of a small BS in a mobile communication system including a macro BS to which a CC of a predetermined frequency band is assigned, and at least one small BS to which N CCs are assigned, of which a frequency band is different from the CC assigned to the macro BS, is provided. The method includes receiving a DCH that is formed of transmission resources allocated to the macro BS, detecting a DS indicating predetermined information from the received DCH, and obtaining predetermined information from the detected DS, wherein the predetermined information is one of at least one CC information used by the small BS, CID index information of the small BS, and a dormant BS index when the small BS is a dormant mode.

In accordance with another aspect of the present disclosure, an apparatus of a small BS for transmitting a DS in a mobile communication system including a macro BS to which a CC of a predetermined frequency band is assigned, and at least one small BS to which N CCs are assigned, of which a frequency band is different from the CC that is assigned to the macro BS, is provided. The apparatus includes a controller configured to transfer predetermined information to a DS generating unit, the DS generating unit configured to generate a DS corresponding to the predetermined information, and a transceiving unit configured to transmit the generated DS through a DCH that is formed of transmission resources of the macro BS, wherein the predetermined information includes one of at least one CC information used by the small BS, CID index information of the small BS, and a dormant BS index when the small BS is in a dormant mode.

In accordance with another aspect of the present disclosure, an apparatus of a UE for receiving a DS a small BS, in a mobile communication system including a macro BS to which a CC of a predetermined frequency band is assigned, and at least one small BS to which N CCs are assigned, of which a frequency band is different from the CC assigned to the macro BS, is provided. The apparatus includes a transceiving unit configured to receive a DCH that is formed of transmission resources allocated to the macro BS, a DS detecting unit configured to detect a DS indicating predetermined information from the received DCH, and a controller configured to obtain the predetermined information from the detected DS, wherein the predetermined information includes one of at least one CC information used by the small BS, CID index information of the small BS, and a dormant BS index when the small BS is in a dormant mode.

In the present disclosure, the DS is generated using a single predetermined code or a predetermined number of orthogonal codes having different values.

In the present disclosure, when the predetermined information is the CC information and the DS is generated using a single predetermined code, the DCH includes N transmission areas that are mapped respectively to N CC values, and the DS is transmitted through a transmission area that is mapped to a CC information value corresponding to the DS.

In the present disclosure, when the predetermined information is the CC information and the DS is generated using a predetermined number of orthogonal codes, the orthogonal codes are formed of N orthogonal codes that are mapped respectively to N CC information values, the DCH includes a single transmission area for the transmission of the DS, and the DS is transmitted through the single transmission area for the transmission of the DS, irrespective of the CC information value.

In the present disclosure, when the predetermined information is a CID configuration information index of the small BS, and the DS is generated using a single predetermined code, the DCH includes L transmission areas that are mapped respectively to L CID configuration information index values, and the DS is transmitted through a transmission area that is mapped to a CID configuration information index value corresponding to the DS.

When the predetermined information is a CID configuration information index of the small BS, and the DS is generated using a predetermined number of orthogonal codes, the orthogonal codes are formed of L orthogonal codes that are mapped respectively to L CID configuration information index values, the DCH includes a single transmission area for the transmission of the DS, and the DS is transmitted through the single transmission area for the transmission of the DS, irrespective of the CID configuration information index value.

In the present disclosure, when the predetermined information is the dormant BS index and the DS is generated using a single predetermined code, the DCH includes K transmission areas that are mapped respectively to K dormant BS index values, and the DS is transmitted through a transmission area that is mapped to a dormant BS index value corresponding to the DS.

In the present disclosure, when the predetermined information is the dormant BS index and the DS is generated using a predetermined number of orthogonal codes, the orthogonal codes are formed of K orthogonal codes that are mapped respectively to K dormant BS index values, the DCH includes a single transmission area for the transmission of the DS, and the DS is transmitted through the single transmission area, irrespective of the dormant BS index value.

In the present disclosure, when the small BS does not communicate with a UE during a predetermined period of time, the small BS enters a dormant mode, transmits, to the macro BS, at least one of a dormant mode indicator indicating that the small BS in a dormant mode and CC information used by the small BS, and receives the dormant BS index from the macro BS.

In the present disclosure, when an active mode entry message is received from the macro BS, the small BS cancels the dormant mode and enters the active mode.

In the present disclosure, the DCH area is determined based on DCH location information that is transferred in advance from the macro BS, and the DCH location information may be fixed to a predetermined area among transmission resources of the macro BS, or may be determined based on a CID of the macro BS.

In the present disclosure, in the case where the predetermined information is the CC information when the small BS selects a CC to be used, a CC having the smallest traffic, or a CC that is not used by an adjacent small BS, may be selected out of available CCs.

In the present disclosure, a downlink resource or an uplink resource of the macro BS may be used as a transmission resource of the macro BS.

In the present disclosure, when the predetermined information is the CC information and the DS is generated using a single predetermined code, a UE obtains the CC information from the DS using CC-based S-DS location information, which is provided in advance from a macro BS.

In the present disclosure, when the predetermined information is the CC information and the DS is generated using a predetermined number of orthogonal codes, a UE obtains the CC information using the mapping relationship between CCs and orthogonal codes, and S-DS location information, which are provided in advance from a macro BS.

In the present disclosure, when the predetermined information is a CID configuration information index of the small BS, and the DS is generated using a single predetermined code, a UE obtains the CID configuration information index from the DS using S-DS location information for each CID configuration information index, which is provided in advance from a macro BS.

In the present disclosure, when the predetermined information is a CID configuration information index of the small BS, and the DS is generated using a predetermined number of orthogonal codes, a UE obtains the CID configuration information index using the mapping relationship between CID configuration information indices and orthogonal codes and the S-DS location information, which are provided in advance from a macro BS.

In the present disclosure, the number of dormant BS indices may be set to be smaller than the number of small BSs. In this instance, when the number of dormant BS indices is smaller than the number of dormant mode small BSs, a single dormant BS index may be allocated to a plurality of small BSs. In this instance, a single dormant BS index may be allocated to a plurality of small BSs, which are geographically distant from one another.

In accordance with another aspect of the present disclosure, a method for a macro BS to control a small BS in a mobile communication system that includes the macro BS to which a CC of a predetermined frequency band is assigned, and at least one small BS to which N CCs are assigned, of which a frequency band is different from the CC that is assigned to the macro BS, is provided. The method includes receiving a dormant mode entry message from a dormant mode small BS, transmitting a predetermined dormant BS index to the small BS, receiving the dormant BS index from a UE that receives, from the dormant mode small BS, a discovery signal indicating the dormant BS index, and transmitting an active mode entry message to the dormant mode small BS.

Also, the method further includes receiving, from the small BS, the dormant BS index and CC information used by the small BS and transmitting the received CC information to the UE.

In accordance with another aspect of the present disclosure, a macro BS that controls a small BS in a mobile communication system including the macro BS to which a CC of a predetermined frequency band is assigned, and at least one small BS to which N CCs are assigned, of which a frequency band is different from the CC assigned to the macro BS, is provided. The macro BS includes a transceiving unit that receives a dormant mode entry message from a dormant mode small BS, a controller that controls a message generating unit to generate a predetermined dormant BS index, and a message generating unit that generates the dormant BS index under the control of the controller and transmits the same to the small BS through the transceiving unit, wherein the controller controls the message generating unit to transmit an active mode entry message to the dormant mode small BS when receiving the dormant BS index through the transceiving unit from a UE that receives a discovery signal indicating the dormant BS index from the dormant mode small BS.

The controller receives the dormant BS index and CC information used by the small BS through transceiving unit from the small BS, and transmits the received CC information to the UE through the transceiving unit.

Effects that may be achieved through the construction of the present disclosure will be briefly described as follows.

In the present disclosure, when a macro BS and a small BS use CCs of different frequency bands, the small BS transmits a discovery signal using a transmission resource of an f0 band that was assigned to the macro BS, so as to inform a UE of the existence of the small BS.

The UE may recognize that the small BS exists by executing a search through the f0 band, which is a frequency band of a CC used by the macro BS, instead of executing a search through N frequency bands f1 to fN that were assigned to the small BS. Therefore, the UE may not continuously execute a search through a frequency band of the small BS and, thus, the amount of power consumed in the UE may be reduced.

Also, the present disclosure provides frequency information of a CC used by a small BS through a discovery signal of the small BS and, thus, a UE may reduce the cell association time for a cell association with the small cell.

Also, in the present disclosure, when a small BS operates in a dormant mode, the small BS reports that the small BS operates in the dormant mode through a discovery signal. Accordingly, when a new UE enters the small BS that operates in the dormant mode, the UE may promptly recognize that the small BS that operates in the dormant mode exists in a nearby location, and subsequently, may enable the small BS of the dormant mode into an active mode, thereby reducing a cell association delay between the UE and the small BS.

Also, in the present disclosure, a small BS provides a CID configuration information index that may configure a CID of the small BS to a UE through a discovery signal, thereby increasing the number of CIDs in a whole system.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
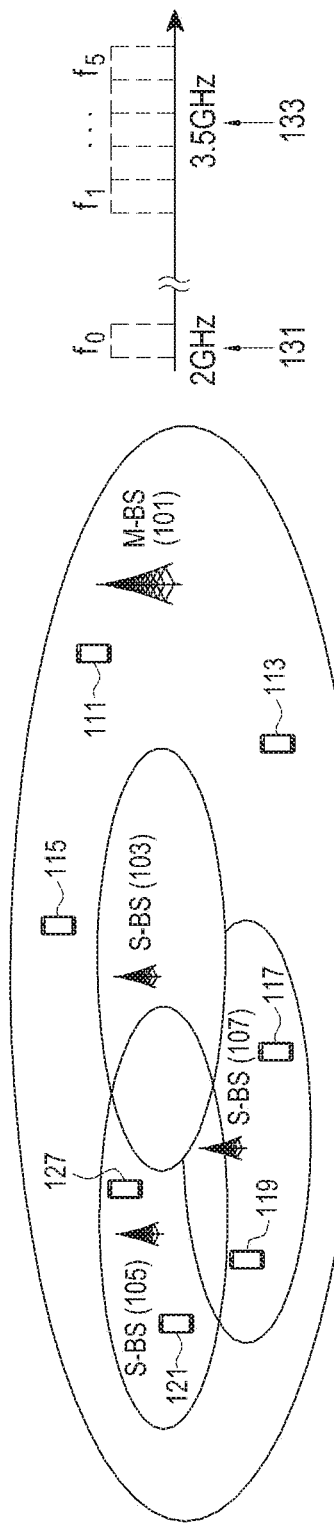
FIG. 1 is a diagram illustrating a separate frequency band mobile communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, terms, such as first, second, or the like, may be used herein when describing various components of the present disclosure. Each of these terminologies is not used to define a corresponding component but used merely to distinguish the corresponding component from other component(s). For example, a first component element may be referred to as a second component element, and similarly, the second component element may be referred to as the first component element without departing the scope and sprit of the disclosure. The term, such as "and/or", includes a combination of a plurality of related mentioned items or one of the plurality of related mentioned items.

As used herein, terms are used merely for describing specific embodiments are not intended to limit the present disclosure. The singular terms cover plural components unless the singular terms have apparently different meaning contextually. In this application, terms, such as "comprise" or "have," shall be understood that they are used merely for designating that corresponding features, numbers, steps, actions, components, parts or the combinations thereof may exist, but not excluding in advance the possibility of existence or addition of the features, the numbers, the steps, the actions, the components, the parts or the combinations thereof.

Unless defined otherwise, all the terms including technical or scientific terms used herein have the same meaning as those understood generally by a person having an ordinary skill in the art. The terms having the same meaning as those defined in generally used dictionaries shall be construed to have the meaning conforming to the contextual meaning of the related technologies, and shall not be construed as ideal or excessively formal meaning unless the terms are apparently defined in this application.

Hereinafter, detailed descriptions of the present disclosure will be described with reference to the accompanying drawings, which illustrate specific embodiments by which the present disclosure may be carried out.

Terms and abbreviations used in the present specification will be described first.

"Macro cell base station (BS)", "macro BS", and "m-BS" may be interchangeably used.

"Small cell BS" is a BS having a small coverage, which is under the management of a macro BS or is independent from the macro BS, and "small cell BS", "small BS", and "s-BS" are interchangeably used. That is, the small cell BS may be dependent upon the macro cell BS or may have a parallel relationship with the macro cell BS.

"Mobile terminal", "terminal", and "user equipment (UE)" are interchangeably used.

"Component carrier" indicates each carrier used in the carrier aggregation (CA) technology in a mobile communication system, which is abbreviated to "CC".

"Discovery Signal" is a signal used when a BS informs ambient entities of the existence of the BS itself, which is abbreviated to "DS". In the present disclosure, a discovery signal of a small BS is mainly described, and thus, the DS will be referred to as an S-DS which is a discovery signal of a small BS. Also, the S-DS may be abbreviated to "DS", and here, the DS indicates an S-DS, unless otherwise noted.

"Cell searching" indicates that a UE searches for a macro BS/small BS located around the UE to execute communication, which includes monitoring a frequency band of a corresponding BS.

Before giving a detailed description of the present disclosure, it is helpful to give a brief overview of the present disclosure.

According to the present disclosure, in a wireless communication system or a mobile communication system that includes a first BS that uses a component carrier of an f0 band and second BSs to which component carriers of N frequency bands are assigned, the N frequency bands being different from f0, the second BS generates a discovery signal for reporting the existence of the second BS to UEs within a coverage of the second BS, and transmits the discovery signal through a transmission resource of the f0 band. For example, the first BS may be a macro BS, and the second BS may be a small BS. Hereinafter, descriptions will be provided from the perspective of a macro BS and a small BS.

The discovery signal may indicate information used for communication between a small BS and a UE. A first embodiment of the present disclosure will describe that a discovery signal indicates CC information used by a small BS. A second embodiment of the present disclosure will describe that a small BS operates in a dormant mode when a UE does not exist within a coverage of the small BS during a predetermined period of time, and a discovery signal indicates dormant mode index information to report that the small BS operates in the dormant mode in case a new UE enters the coverage when the small BS operates in the dormant mode. Also, a third embodiment of the present disclosure will describe that a discovery signal indicates a cell identification (CID) configuration information index that may configure a CID of a small BS.

The description in one embodiment may be applied to another embodiment, except for a case of apparent contradiction. Therefore, the embodiments of the present disclosure are distinguished for ease of description, and the embodiments may not always be implemented by being distinguished, but may be implemented in parallel.

Hereinafter, the embodiments of the present disclosure will be described in detail.

FIG. 1 is a diagram illustrating a separate frequency band mobile communication system according to an embodiment of the present disclosure.

Referring to FIG. 1, a plurality of small BSs 103, 105, and 107 are installed in a macro BS 101. Referring to FIG. 1, three small BSs are illustrated. It is illustrated that a plurality of UEs 111, 113, 115, 117, 119, 121, and 127 are located in an area of the macro BS 101. Also, some of the UEs 111, 113, 115, 117, 119, 121, and 127 are located in areas of the small BSs 103, 105, and 107. For example, some UEs 117 and 119 are located in the area of the small BS 107, and other UEs 121 and 127 are located in the area of the small BS 105. Some UEs 111, 113, and 115 are located in the area of the macro BS 101 but are not located in any small BS's area.

It is assumed that the macro BS 101 uses a frequency of 2 GHz 131, which is a relatively low band, and the small BSs 103, 105, and 107 uses frequencies f1, f2, . . . , f5 133 based on 3.5 GHz, which are relatively high band.

In the separate frequency band system as shown in FIG. 1, a UE may need to recognize the existence of the macro BS 101 or the small BSs 103, 105, and 107. To this end, the UE executes a search through both the 2 GHz band, which is a frequency of the macro BS 101, and the 3.5 GHz band, which is a frequency of the small BSs 103, 105, and 107, so as to receive a reference signal that is transmitted by corresponding BSs 101, 103, 105, and 107.

The macro BS is designed to have a broad coverage area and transmits a signal at a relatively high transmission power, and thus, an area where a UE is located may be generally included in the coverage of the macro BS. Therefore, generally, a UE executes a search through the 2 GHz band, which is the frequency band the macro BS, so as to receive, from the macro BS, information used for operations of the UE.

Conversely, the small BS is designed to have a relatively narrow coverage area and thus, transmits a signal at a relatively low transmission power. When a UE is located far from the small BS and exists outside the coverage of the small BS, the corresponding UE may not receive a signal transmitted from the small BS. An example is depicted in FIG. 2.

Figure 2:
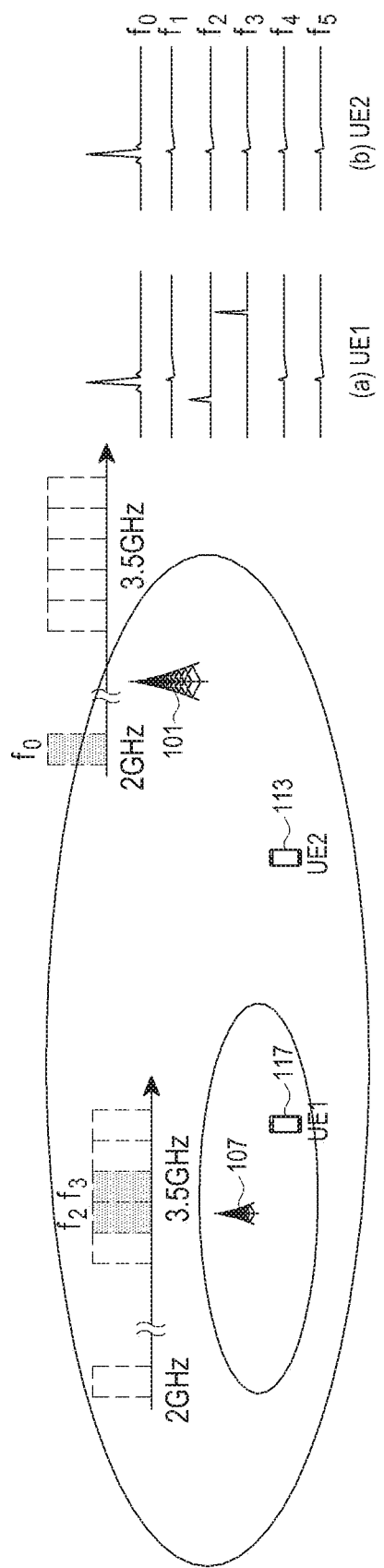
FIG. 2 is a diagram illustrating an example of cell searching based on a location of a user equipment (UE) in a separate frequency band system according to an embodiment of the present disclosure.

FIG. 2 is a diagram illustrating an example of cell searching based on a location of a UE in a separate frequency band system according to an embodiment of the present disclosure.

Referring to FIG. 2 is a separate frequency band system as shown in FIG. 1, and illustrates that a single small BS 107 and two UEs, that is, UE1 117 and UE2 113, are included in the single macro BS 101, for ease of description. As described in FIG. 1, the macro BS 101 uses CC (f0) of the 2 GHz band, and CCs (f1~f5) of the 3.5 GHz band are assigned to the small BS 107. However, it is assumed that the small BS 107 uses f2 and f3 out of the CCs (f1~f5) of the 3.5 GHz band. The UE1 117 receives signals of f0 of the 2 GHz band and f2 and f3 of the 3.5 GHz band as shown in the diagram (a), since the UE1 117 is located in both the coverage of the macro BS 101 and the coverage of the small BS 107. Conversely, the UE2 113 is located in the coverage of the macro BS 101 but is out of the coverage of the small BS 107, and thus, the UE2 113 receives the signal of f0 of the 2 GHz band but fails to receive the signals of f2 and f3 of the 3.5 GHz band as shown in the diagram (b).

In the above described example, searching through the 3.5 GHz band, which is the frequency of the small BS 107, may cause the UE2 113 to consume unnecessary power. Particularly, when the small BS uses the CA technology and multiple component carriers (CCs) are used, the UE may need to independently execute a search through each of the multiple CCs, generally. Therefore, in this instance, the amount of power consumed in a UE may increase in proportion to the number of CCs.

When a UE that is incapable of recognizing which small BS exists in advance, the UE should receive reference signals transmitted from each of a macro BS and small BSs through a periodic search through the f0 band used by the macro BS and the f1, . . . , fN used by the small BSs.

Accordingly, when comparing a single frequency band system, in which a macro BS transmits a reference signal and a UE executes a search through only the F0 band, and the separate frequency band system, in which the UE executes a search through both the f0 band used by the macro BS and the f1, . . . , fN bands used by the small BSs, the amount of power consumed in the UE in the separate frequency band system may increase in proportion to the number (N) of separate frequency bands.

In the present disclosure, a small BS sets a predetermined area of a transmission resource of a frequency band (f0) of a macro BS, as a discovery channel of the small BS (small BS-discovery channel (S-DCH)). Also, the small BS generates a discovery signal of a small BS (S-BS discovery signal (S-DS)) defined in the present disclosure, and transmits the same through the S-DCH, and a UE detects the S-DS from the S-DCH of the f0 band so as to reduce the amount of power consumed in the UE.

The UE may obtain information used for communication with the small BS, using the detected S-DS. The information used for the communication may include, for example, CC information that a corresponding small BS currently uses, dormant index information for reporting that a small BS operates in a dormant mode when the small BS operates in the dormant mode, or a cell ID (CID) configuration information index for configuring a CID of the corresponding small BS.

The first embodiment will describe that a small BS indicates CC information through an S-DS. The second embodiment will describe that a small BS reports a dormant BS index through an S-DS when the small BS is a dormant BS. The third embodiment will describe that a small BS reports a CID configuration information index of the small BS through an S-DS.

Hereinafter, frequency allocation to enable a small BS to transmit a discovery signal will be described with reference to FIG. 3.

Figure 3:
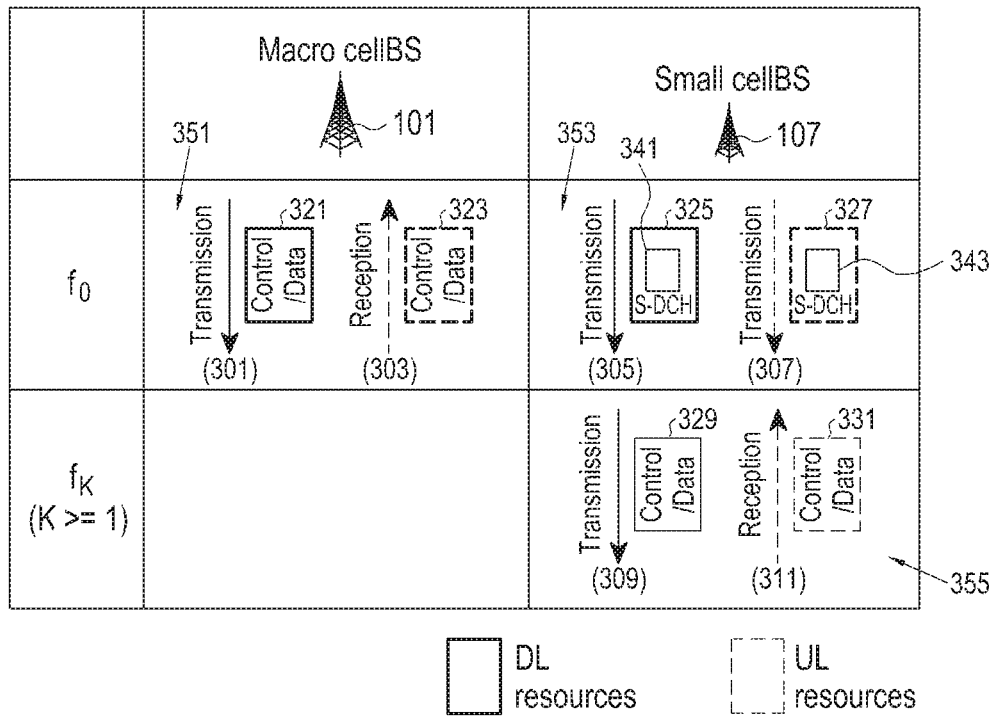
FIG. 3 is a diagram illustrating resource allocation of a macro base station (BS) and a small BS in a separate frequency band system according to an embodiment of the present disclosure.

FIG. 3 is a diagram illustrating resource allocation with respect to a macro BS and a small BS for the transmission of a discovery signal, in a separate frequency band system according to an embodiment of the present disclosure.

In the present disclosure, the small BS generates a discovery signal (S-DS) and transmits the same using a transmission resource of the frequency band (f0) of the macro BS, so as to inform neighboring UEs of the existence of the small BS.

In the present disclosure, a predetermined resource area in the f0 band through which a discovery signal is transmitted is defined as a "discovery channel of a small BS (S-DCH)". In the present disclosure, some or all of a downlink (DL) resource or an uplink (UL) resource in the f0 band, which were allocated to the macro BS, may be used for the S-DCH.

Referring to FIG. 3, downward arrows 301, 305, 307, and 309 indicate downlink transmission in which the macro BS 101 or the small BS 107 transmits a signal to a UE, and upward arrows 303 and 311 indicate that the macro BS 101 or the small BS 107 receives an uplink transmission signal of a UE. Also, solid line boxes 321, 325, and 329 indicate that a DL resource is used. Broken line boxes 323, 327, and 331 indicate that a UL resource is used.

That is, in the diagram 351, the solid line arrow 301 and the solid line box 321 indicate that the macro BS 101 executes a downlink transmission of control/user data using a downlink resource of the f0 band. The broken line arrow 303 and the broken line box 323 indicate that the macro BS 101 receives control/user data using an uplink resource in the f0 band.

In the diagram 353, the solid line arrow 305 and the solid line box 325 indicate that the small BS 107 executes a downlink transmission using a downlink resource of the f0 band, which is a frequency that was originally allocated to the macro BS 101. A small box 341 inside the solid line box 325 is a discovery channel (S-DCH) of the small BS 107, according to the present disclosure, and indicates that some of the downlink resources of the f0 band is used.

The broken line arrow 307 and the broken line box 327 indicate a downlink transmission using an uplink resource of the f0 band, which was originally allocated to the macro BS 101. A small box 343 inside the broken line box 327 is an S-DCH of the small BS 107, and indicates that some of the uplink resource of the f0 band is used.

In the diagram 355, the solid line arrow 309 and the solid line box 329 indicate that the small BS 107 executes a downlink transmission of control/user data using a downlink resource of the fk band, which was originally allocated to the small BS 107. The broken line arrow 311 and the broken line box 331 indicate that the small BS 107 receives control/user data using an uplink resource in the fk band.

In the above described example, the diagram 351 uses f0, which is a frequency band that was originally allocated to the macro BS 101, and the diagram 355 uses fk, which is a frequency band that was originally allocated to the macro BS 101, which are identical to a general resource allocation scheme. Conversely, the diagram 353 shows that a downlink resource and an uplink resource of the f0 band, which were originally allocated to the macro BS 101, are allocated to a discovery channel of the small BS 107. Accordingly, the diagram 353 shows that a transmission resource of a macro BS is allocated to a discovery channel of a small BS according to a scheme proposed in the present disclosure.

As described in the descriptions with reference to FIG. 3, an S-DCH which is a transmission resource for the transmission of an S-DS, is allocated and thus, the small BSs include an S-DS in the S-DCH for transmission. In this instance, a small BS may execute transmission by including, in an S-DS, information associated with operations and management of the corresponding small BS.

First Embodiment

Hereinafter, the first embodiment, in which CC information used by a small BS is indicated by an S-DS, will be described.

When a small BS desires to generate an S-DS, the small BS determines a CC to be used, first. As described in FIGS. 1 and 2, it is assumed that a macro BS uses a single CC and N CCs are additionally allocated to small BSs in a separate frequency band system. In this instance, a small BS may use only M CCs out of the N available CCs (M=<N), so as to reduce interference to an adjacent cell and unnecessary power consumption.

Generally, an M value becomes large as the number of UEs that desire to receive a service from a corresponding small BS increases. As the small BS uses a larger value, the small BS is capable of using a broader bandwidth and thus, the capacity of data that may be transmitted by the small BS may increase. Therefore, small BSs use different M values based on their environments, and may select a combination of M CCs out of the given N CCs to be different from one another. Each small BS may transfer all or some of the information that is associated with M CCs used by a corresponding small BSs to neighboring UEs through an S-DS. Hereinafter, an example of a scheme of selecting and transferring one of the M CC information will be described.

Figure 4:
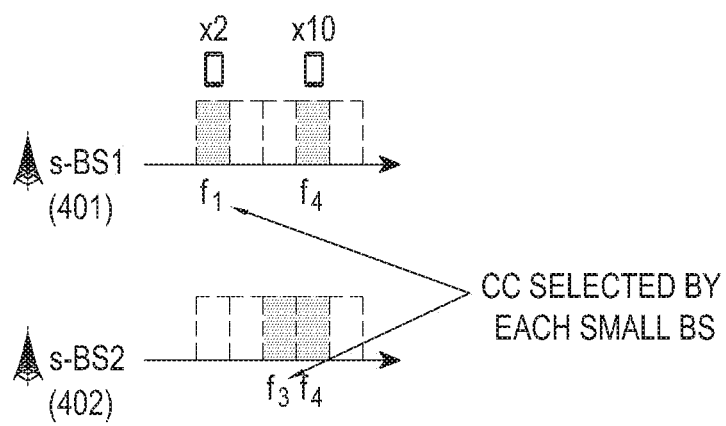
FIG. 4 is a diagram illustrating an example in which a small BS selects a component carrier (CC) according to a first embodiment of the present disclosure.

FIG. 4 is a diagram illustrating an example of selecting one of M CCs that a small BS uses, so as to transfer CC information through an S-DS, according to a first embodiment of the present disclosure.

Referring to FIG. 4, it is assumed that, M=2, a small BS1 401 uses f1 and f4, a small BS2 402 uses f3 and f4, and the small BS1 401 and the small BS2 402 are close to one another. Also, it is assumed that two UEs are allocated in f1, and 10 UEs are allocated in f4, in the small BS1 401.

In the present disclosure, when a small BS selects a CC, two schemes are considered. A first scheme is to select a CC having the smallest traffic by taking into consideration traffic of a corresponding frequency. A second scheme is to select a CC that is not used by an adjacent small BS. In FIG. 4, when the small BS1 401 selects a CC according to the first scheme, the small BS1 401 selects f1 which is a CC having a smallest number of allocated UEs, out of f1 and f4. When the small BS2 402 selects a CC according to the second scheme, the small BS2 402 may select f3 which is not used by the small BS1 401 that is an adjacent BS, out of f3 and f4. However, depending on cases, a predetermined CC which is set as a default may be used.

Hereinafter, a scheme of generating an S-DS corresponding to a CC selected by a small BS in FIG. 4 will be described with reference to FIGS. 5 and 6. Two schemes may be used to generate an S-DS. A first scheme is a case when all of the codes included in an S-DS have an identical value, irrespective of a type of CC. A second scheme is a case when the codes included in an S-DS have different values based on a type of CC, that is, orthogonal codes are used.

Figure 5:
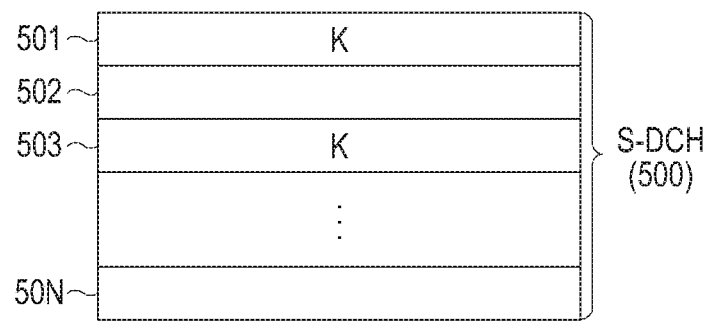
FIG. 5 is a diagram illustrating an example of generating an discovery signal (S-DS) using a single code according to a first embodiment of the present disclosure.

FIG. 5 is a diagram illustrating an example of generating an S-DS using a single code according to the first embodiment of the present disclosure.

Referring to FIG. 5, an S-DCH 500 includes resource areas 501, 502, 503, . . . , 50N) through which an S-DS may be transmitted for each CC, so as to indicate a CC used by a corresponding small BS out of f1~fN. That is, the areas 501, 502, 503, . . . , 50N may be areas through which S-DSs corresponding to CC frequencies f1, f2, f3, . . . , fN are transmitted. When a predetermined code (here, expressed as k) is inserted into each area, this may indicate that a CC that corresponds to the corresponding area is used by a small BS.

That is, in FIG. 5, a location where an S-DS formed of a single predetermined code (k) is transmitted may indicate a corresponding CC, irrespective of a CC frequency. For example, the area 501 is mapped to f1, the area 502 is mapped to f2, . . . , and the area 50N is mapped to fN. Although FIG. 5 illustrates that the areas 501, 502, 503, . . . , and 50N are consecutive, the areas may not need to be consecutive. As long as a predetermined area indicates a predetermined CC, it does not matter if the areas are separated.

Both a UE and a small BS may need to know "CC-based S-DS location information (or S-DCH location information)". To this end, a macro BS provides "CC-based S-DS location information" to UEs in a corresponding coverage by including the same in a broadcasting message or a general control message. Also, mapping information may be transferred to a small BS through a backhaul network.

For example, in the case of an LTE system, when an S-DS is transmitted on a physical downlink shared channel (PDSCH) defined in the long-term evolution (LTE) system, a location of an S-DS for each CC is fixed to a predetermined area on the PDSCH, and information thereof may be provided to UEs.

For example, when N=4, a location of an S-DS corresponding to f1 is fixed to (1, 1) of a (frequency, time) pair of a PDSCH, a location of an S-DS corresponding to f2 is fixed to (1, 2) on the PDSCH, a location of an S-DS corresponding to f3 is fixed to (1, 3), ..., and a location of an S-DS corresponding to fN is fixed to (1, N), and the location information of an S-DS for each CC may be transferred to a UE. When an area of a transmission resource through which the S-DS is transmitted, is determined, a collision with an existing system should be prevented. For example, a general control signal and a reference signal (RS) are transmitted on a PDSCH. In this instance, to avoid a collision with a location where the control signal and the reference signal are transmitted, the location of an S-DS may need to be set to a resource area where the control signal and the reference signal are not transmitted.

The location of the S-DCH may be determined based on a function associated with a cell identification (CID) of a macro BS. For example, small BSs that belong to a macro BS of which a CID is "1" may set the location of an S-DCH to an area of number 1 that includes N resources on a PDSCH, and may set the N resources to sequentially correspond to f1~fN. When an area of an S-DCH, where an S-DS is transmitted, is determined using a CID as a function, small BSs located in coverages of macro BSs having different CIDs may transmit an S-DS in different resource areas. In this instance, a UE may obtain a CID of a macro BS through a synchronization signal on an existing PDSCH, and thus, a separate transmission resource for reporting the location information of the S-DS to a UE may not be needed, which is advantageous. However, a small BS may not always need to belong to a predetermined macro BS. For example, small BSs located in an overlapping area of the coverages of two macro BSs may transmit an S-DS through an S-DCH area corresponding to a CID of each of the two macro BSs.

Referring again to FIG. 5, FIG. 5 illustrates a case in which two small BSs select f1 and f4, respectively, and transmit an S-DS using a single predetermined code (k), or a case in which a single small BS select two CCs, f1 and f4, and transmits an S-DS using a single predetermined code (k). By assuming the latter case, a small BS selects f1 and f3, accordingly, the small BS transmits a single predetermined code (k) in locations 501 and 503 on the S-DCH 500, which correspond to f1 and f3. UEs measure the strength of a reception signal in each of the transmission areas 501 to 50N on an S-DCH, based on S-DCH location information, and when an area of which a measured reception signal strength is greater than or equal to a predetermined threshold value is detected, the UEs may recognize that a small BS that uses a CC corresponding to the area exists.

Figure 6:
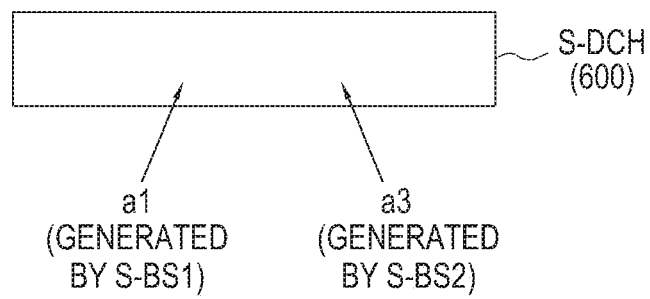
FIG. 6 is a diagram illustrating an example of generating an S-DS using orthogonal codes having different values according to a first embodiment of the present disclosure.

FIG. 6 is a diagram illustrating an example of generating an S-DS using orthogonal codes having different values according to a first embodiment of the present disclosure.

Referring to FIG. 6, CCs used by a small BS may be distinguished using orthogonal codes having different values. For example, when CCs that are available for the small BS are f1, f2, f3, and f4, the CCs are distinguished by respectively mapping orthogonal codes a1, a2, a3, and 4 having different values to f1, f2, f3, and f4. Also, each small BS generates an S-DS using orthogonal codes corresponding to some or all of the CCs that are available for a corresponding small BS, and transmits the same by inserting the same into a predetermined S-DCH 600 in the f0 band resources.

For example, in the case of the LTE system, each small BS inserts an S-DS generated by itself into a predetermined location of a PDSCH, and transmits the same. For example, when a small BS1 uses f1 and a small BS2 uses f3, the small BS1 generates an orthogonal code a1 as an S-DS, inserts the same into an S-DCH on the PDSCH, and transmits the same. The small BS 2 generates an orthogonal code a3 as an S-DS, inserts the same into a location of an S-DCH on the PDSCH, and transmits the same. In this instance, the location of the S-DCH where the small BS1 inserts an S0DS and the location of the S-DCH where the small BS2 inserts an S-DS are identical.

A UE may need to know a mapping relationship between CC (f1, f2, f3, and f4) and an orthogonal code value (a1, a2, a3, and a4), and an S-DCH location where an S-DS is inserted. The mapping relationship between CCs and orthogonal codes and the S-DS location information (that is, S-DCH location information) may be provided to UEs through a broadcasting message or a control message transmitted by a macro BS, and may be provided to a small BS through a backhaul network, as described in FIG. 5. The mapping relationship between CCs and orthogonal codes may be fixed or may be changed based on a function associated with a CID of the macro BS. In the same manner, the S-DCH location information may be fixed to a predetermined location on a PDSCH, or may be changed for each macro BS based on a function associated with a CID of a macro BS.

As described above, the UE is aware of the S-DCH location information and the mapping relationship between CCs and orthogonal codes and thus, the UE may detect a1 and a3 using a correlation measurement value between a signal received in the S-DCH area on the PDSCH based on the location information and the orthogonal codes a1, a2, a3, and a4. That is, the UE may measure a correlation with the signal received in the S-DCH area on the PDSCH using the candidate orthogonal codes a1, a2, a3, and a4, which are known to the UE, may regard an orthogonal code of which a measured correlation value is greater than or equal to a predetermined threshold value as an S-DS that is transmitted by the small BS, and may recognize a CC used by the small BS.

In the above described example, S-DS 1 (that is, code value a1) that is transmitted by the small BS1 and S-DS 2 (that is, code value a3) that is transmitted by the small BS2 are included in the S-DCH area on the PDSCH. Accordingly, when a UE uses a1 out of the candidate orthogonal codes, S-DS 1 transmitted by the small BS 1 may be detected. When the UE uses a3 out of the candidate orthogonal codes, S-DS 2 transmitted by the small BS 2 may be detected. When the UE uses a2 or a4, a signal may not be detected. In this instance, the UE selects a signal having a stronger signal strength out of two detected signals, and executes procedures to perform communication with a small BS in a CC band corresponding to a code value of the selected S-DS.

When comparing the scheme of FIG. 5 and the scheme of FIG. 6, the following difference may be found. In FIG. 5, the CCs used by small BSs are distinguished based on a location where an S-DS is transmitted. Therefore, each small BS uses an identical code value when generating an S-DS. Conversely, in FIG. 6, S-DSs are generated using different orthogonal code values whereby the CCs used by small BSs are distinguished. Therefore, when a small BS generates an S-DS, the small BS uses an orthogonal code value that is different based on a CC used by the small BS. However, S-DSs having different values for each CC may be transmitted in an identical location.

Hereinafter, a process in which UEs receive an S-DS transmitted by a small BS will be described.

Figure 7:
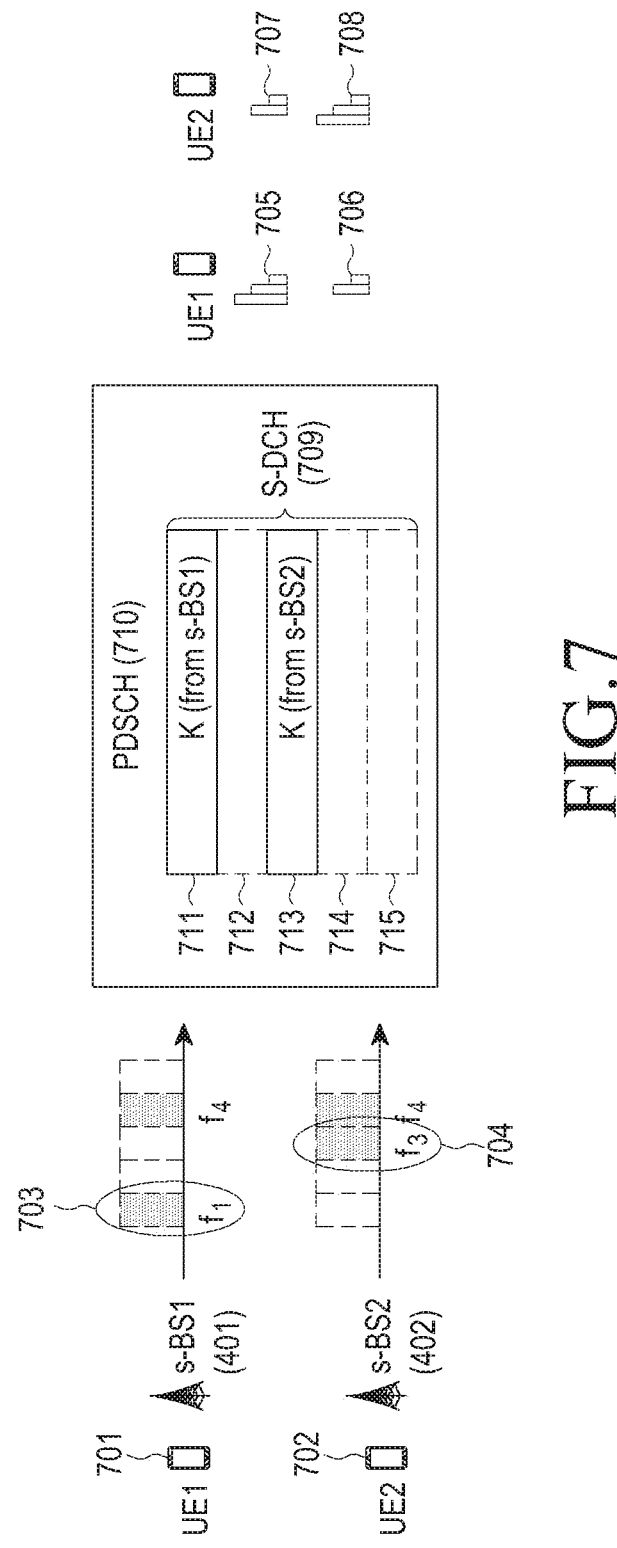
FIG. 7 is a diagram illustrating a process in which a UE receives an S-DS transmitted by a small BS according to a first embodiment of the present disclosure.

FIG. 7 is a diagram illustrating a process in which a UE receives an S-DS transmitted by a small BS according to a first embodiment of the present disclosure.

Referring to FIG. 7, it is assumed that the small BS1 401 and small BS2 402 select f1 703 and f3 704, respectively, as described in FIG. 4, and a UE1 701 is adjacent to the small BS1 401, and a UE2 702 is adjacent to the small BS2 402. Also, in FIG. 7, the small BSs may generate S-DSs according to the scheme described in FIG. 5 or FIG. 6. In FIG. 7, however, it is assumed that an S-DS is generated using a single code (k) as described in FIG. 5, for ease of description.

The small BS1 401 generates an S-DS using a predetermined code (k), inserts the same into an area 711 corresponding to f1, in an S-DCH area 709 on a PDSCH 710, and transmits the same. The small BS2 402 generates an S-DS using a predetermined code (k), inserts the same into an area 713 corresponding to f3, in the S-DCH area 709 on the PDSCH 710, and transmits the same.

To detect an S-DS transmitted from the small BSs 401 and 402 and to obtain CC information, each UE 701 and 702 measures a strength of a reception signal in each of N (FIG. 7 assumes that N is 5)S-DS transmission areas 711, 712, 713, 714, and 715 using location information of the S-DCH 709, which may be previously known to the UEs.

In the S-DCH 709, an S-DS (k) transmitted by the small BS1 401 is included in the area 1 711, and an S-DS (k) transmitted by the small BS2 402 is included in the area 3 713. Among the strength of a reception signal measured by the UE1 701 in each of the 5 S-DS transmission areas 711, 712, 713, 714, and 715, a strength 705 measured in the area 1 711 that includes the S-DS(k) transmitted by the small BS1 401 is the strongest. A strength 706 of a reception signal measured in the area 3 713 that includes the S-DS (k) transmitted by the small BS2 402 is weaker than the strength 705 of a signal measured in the area 1 711. When the signal strength in the area 3 713 is less than a predetermined threshold value and the signal strength in the area 1 711 is greater than or equal to a predetermined threshold value, the UE1 701 may disregard the signal detected from the area 3 713 and may recognize that a small BS that uses f1 exists in a region near the UE1 701 based on the signal detected from the area 1 711.

However, the UE1 701 only recognizes that a small BS that uses f1 currently exists, but does not know that the corresponding small BS is the small BS1 701. Therefore, the UE1 701 recognizes that a small BS that uses f1 exists by executing a search through the current f0 band. Accordingly, the UE1 701 activates the f1 band, receives a reference signal and a control signal transmitted by the small BS1 401 through the f1 band, obtains a CID of the corresponding small BS, and recognizes that the corresponding small BS is the small BS1 401. Subsequently, the UE1 701 executes communication with the small BS1 401 according to a normal procedure.

In the same manner, the UE2 702 may recognize that a small BS that uses f3 exists a nearby region based on a signal 708 detected from the area 3 713 which is stronger than a signal 707 from an area 1 711, and subsequently, may activate the f3 band and execute communication with the small BS2 402.

Hereinafter, the operations of a small BS and a UE associated with the above descriptions will be described.

Figure 8:
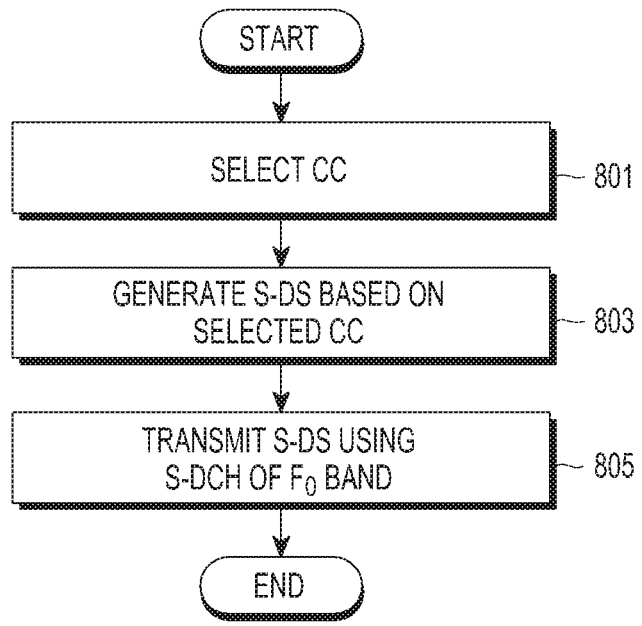
FIG. 8 is a diagram illustrating an operation in which a small BS generates and transmits an S-DS according to a first embodiment of the present disclosure.

FIG. 8 is a diagram illustrating an operation in which a small BS generates and transmits an S-DS according to a first embodiment of the present disclosure.

In operation 801, a small BS selects at least one CC out of available N CCs. Only one CC may be selected out of the CCs selected as described above, by taking into consideration a traffic load of each CC, information associated with whether an adjacent small BS uses a CC, or the like. Since this has been described in FIG. 4, detailed description thereof will be omitted. In operation 803, a small BS generates an S-DS based on the selected CC. A scheme of generating an S-DS has been described with reference to FIGS. 5 and 6, and thus, a detailed description thereof will be omitted.

In operation 805, the generated S-DS is transmitted using an S-DCH transmission resource of an f0 band that is determined in advance. When an S-DS is generated using a single code as described in FIG. 5, an S-DS for each CC may be transmitted through a transmission resource of an S-DS corresponding to a corresponding CC. In this instance, CC-based S-DS location information may be provided from a macro BS in advance to a small BS through a backhaul network. Also, a location of an S-DS for each CC may be fixed to a predetermined location, or may be determined to be different for each macro BS using a CID of a macro BS as a function.

When an S-DS is generated using an orthogonal code having a different value for each CC, as described in FIG. 6, a location where an S-DS is inserted for each CC may be identical. In this instance, the CC-based code information and the S-DS location information may be obtained in advance from a macro BS through a backhaul network. Also, a CC-based orthogonal code may be fixed to a predetermined orthogonal code, or may be determined to be different for each macro BS using a CID of a macro BS as a function.

Figure 9:
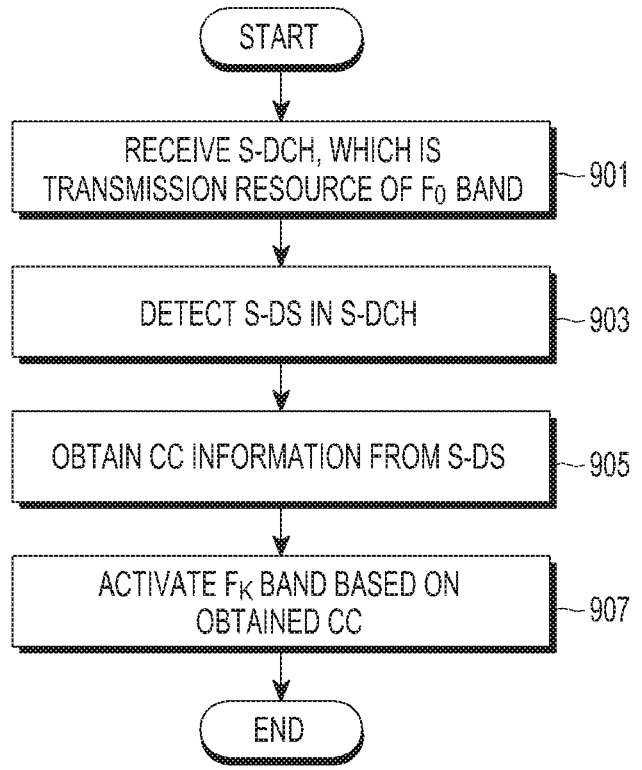
FIG. 9 is a diagram illustrating an operation in which a UE receives an S-DS according to a first embodiment of the present disclosure.

FIG. 9 is a diagram illustrating an operation in which a UE receives an S-DS according to various embodiments of the present disclosure.

In operation 901, a UE executes a search through a transmission resource of an f0 band which is a CC resource of a BS, for example, a predetermined area on a PDSCH of LTE, and receives an S-DCH including an S-DS.

When an S-DS is generated using a single code as described in FIG. 5, an S-DS for each CC may be received through a transmission resource of an S-DS corresponding to a corresponding CC, in an S-DCH. In this instance, CC-based S-DS location information may be provided from a macro BS in advance to a UE through a broadcasting message or a control message. Also, a location of an S-DS for each CC may be fixed to a predetermined location, or may be determined to be different for each macro BS using a CID of a macro BS as a function.

When an S-DS is generated using an orthogonal code having a different value for each CC, as described in FIG. 6, a location of an S-DCH where an S-DS is inserted for each CC may be identical. In this instance, the CC-based code information and the S-DS location information may be obtained in advance from a macro BS through a broadcasting message or a control message. Also, a CC-based orthogonal code may be fixed to a predetermined orthogonal code, or may be determined to be different for each macro BS using a CID of a macro BS as a function.

In operation 903, the strength of a signal included in the S-DCH area is measured and an S-DS having a reception signal strength that is greater than or equal to a predetermined threshold value is detected. When a small BS generates an S-DS using an identical code value as described in FIG. 5, the UE measures the strength of a reception signal in each of N S-DS transmission areas included in the S-DCH area. Conversely, when the small BS generates an S-DS using an orthogonal code that has a different value for one another as described in FIG. 6, the UE measures a correlation value between a signal received in the identical S-DCH area and each of N candidate orthogonal codes corresponding to N CCs.

In operation 905, a reception signal (that is, S-DS) that is greater than or equal to the predetermined threshold value is detected, and CC information is obtained from the detected S-DS using CC-based S-DS location (FIG. 5) or CC-based code information (FIG. 6).

In operation 907, a frequency band (fk) corresponding to the obtained CC information is activated and communication with a corresponding small BS is executed. That is, the communication with the corresponding small BS is executed by receiving a reference signal and a control signal transmitted by the small BS in the fk band.

Second Embodiment

The second embodiment of the present disclosure is a method of operating a small BS in a dormant mode when the small BS that does not execute the transmission and reception of data with a UE exists, and is a method of reporting, to a new UE, the existence of the small BS that operates in the dormant mode when the new UE enters the coverage of the small BS that operates in the dormant mode.

Hereinafter, a small BS that does not execute the transmission and reception of data with a UE is referred to as a "dormant mode" small BS. A small BS that executes the transmission and reception of a reference signal, a control signal, user data, or the like, with a UE to provide a normal cellular service, is referred to as an "active mode" small BS.

In the second embodiment, when a UE to which a small BS provides a service does not exist in the coverage of the small BS, the small BS enters a dormant mode, and suspends the transmission and reception of a reference signal, a control signal, or user data. When a new UE enters the cell coverage of the small BS that operates in the dormant mode, the small BS enters an active mode from the dormant mode.

Figure 10:
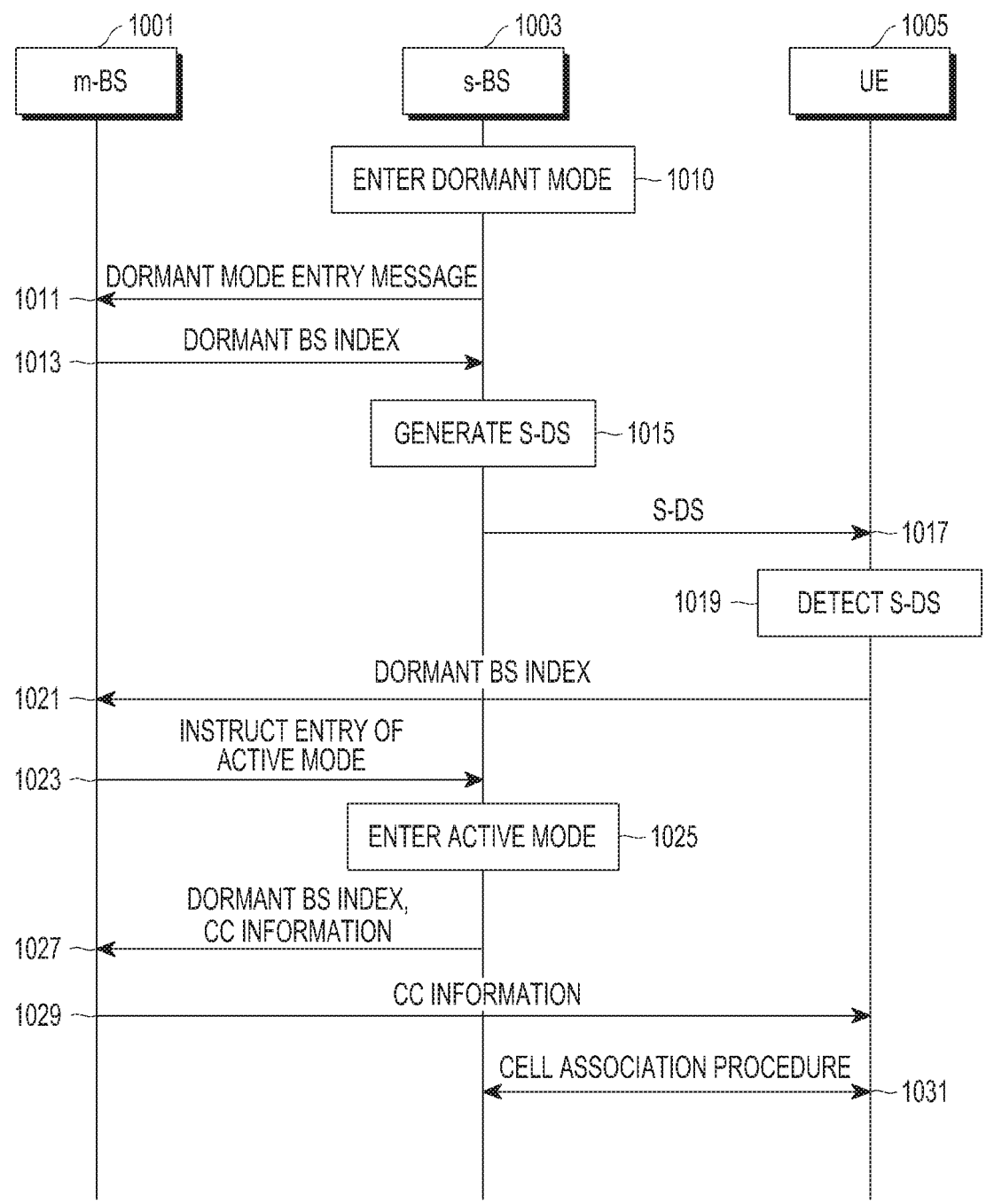
FIG. 10 is a diagram illustrating a process in which a small BS is bilaterally converted between a dormant mode and an active mode according to a second embodiment of the present disclosure.

FIG. 10 is a diagram illustrating a process in which a small BS is bilaterally converted between a dormant mode and an active mode according to a second embodiment of the present disclosure.

When it is determined that a UE does not exist in the cell coverage of a small BS 1003 during a predetermined period of time, the small BS 1003 that currently operates in an active mode enters a dormant mode in operation 1010, and transfers, to a macro BS 1001, a dormant mode entry message (or indicator) indicating that the small BS 1003 enters the dormant mode, through a backhaul network in operation 1011. The macro BS 1001 that receives the dormant mode entry message allocates and transfers a dormant BS index to the small BS 1003 in operation 1013.

Here, the dormant BS index is used to distinguish small BSs that operate in a dormant mode from among a plurality of small BSs. A predetermined number of dormant BS indices may be set, and it is preferable that the number of dormant BS indices is set to be smaller than the total number of small BSs.

For example, when it is assumed that the number of small BSs is 10, it is preferable that the number of small BSs that operate in a dormant mode out of 10 small BSs is less than 10. Therefore, when 4 out of 10 small BSs operate in a dormant mode on average according to a statistical analysis, the number of dormant BS indices may be set to 4 or 5 including a predetermined margin value.

In some instances, all of the 10 small BSs operate in a dormant mode. In this instance, when the number of UEs that operate in a dormant mode is larger than the number of dormant BS indices, a single dormant BS index may be allocated to a plurality of small BSs. In this instance, a macro BS allocates a single dormant BS index to small BSs that are geographically distant from one another, so as to minimize interference between S-DSs generated by the small BSs, which are assigned with the identical dormant BS index.

Referring again to FIG. 10, the small BS 1003 that receives the dormant BS index generates an S-DS corresponding to the dormant mode index to report the existence of the small BS 1003 in operation 1015, and transmits the S-DS through an S-DCH of an f0 band in operation 1017. In operation 1019, a UE 1005 detects the S-DS. Operations 1015 to 1019 will be described as follows.

The S-DS generated by the dormant mode small BS 1003 in operation 1015 may need to be distinguished from an S-DS generated by an active mode small BS. For reference, a method for the active mode small BS to generate an S-DS has been described in the first embodiment.

When it is configured to generate an S-DS using a single code as described in FIG. 5, an S-DCH may need to be allocated for an S-DS that is generated by a dormant mode small BS in addition to an S-DCH for an S-DS that is generated by an active mode small BS. This will be described with reference to FIG. 11.

Figure 11:
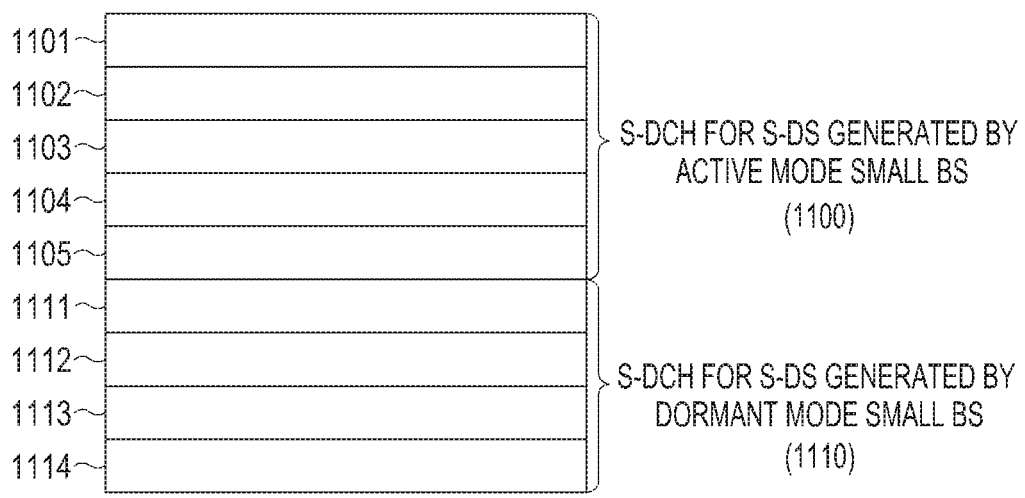
FIG. 11 is a diagram illustrating a structure of an small BS-discovery channel (S-DCH) according to a second embodiment of the present disclosure.

FIG. 11 is a diagram illustrating a structure of an S-DCH according to a second embodiment of the present disclosure.

For example, it is assumed that the total number of small BSs is set to 10, the total number of CCs allocated to the small BSs is set to 5 (f1~f5), and the number of dormant BS indices is set to 4. Under the assumption, the structure of the S-DCH, according to the second embodiment of the present disclosure, is as shown in FIG. 11.

Active mode small BSs transmit S-DSs using an S-DCH 1100 including 5 resource areas 1101 to 1105 from the top, and dormant mode small BSs transmit S-DSs using an S-DCH 1110 including 4 resource areas 1111 to 1114 from the bottom. In this instance, the S-DSs generated by the active mode small BSs and S-DSs generated by the dormant mode small BSs are a single code (k) having an identical value, but have different meanings.

That is, the S-DSs generated by the active mode small BSs indicate a frequency band of a CC used by a corresponding small BS based on a resource area to which a corresponding S-DS is inserted. Conversely, an area where an S-DS generated by the dormant mode small BS is determined based on a dormant BS index that the dormant mode small BS is assigned with from a macro BS, and the dormant mode small BS reports that the small BS itself is in a dormant mode by indicating the assigned dormant BS index.

For example, when a dormant mode BS is assigned with a dormant BS index "1" from a macro BS, the corresponding dormant mode BS inserts an S-DS into a resource area 1111 that is mapped to the dormant BS index "1", and transmits the same. When a UE that receives the S-DS detects the S-DS from the resource area 1111, the UE may recognize that a small BS that is assigned with the dormant BS index "1" exists in a nearby region.

The mapping relationship between a dormant BS index and an S-DCH, and the S-DCH location information are agreed in advance, and may be reported to the UE through a broadcasting message, a control message, or the like of the macro BS. Also, the information may be provided in advance to small BSs through a backhaul network or the like. The location of the S-DCH may be fixed to a predetermined area, or may be determined based on a function using a macro cell identification, which has been described above.

Generalizing the above described descriptions, when a macro BS uses a total of K dormant BS indices, and a total of N CCs are used by small BSs, the total number of transmission resources used to transmit S-DSs generated by an active mode small BS and a dormant mode BS may be N+K.

Referring again to FIG. 10, in operation 1019, the UE 1005 measures a reception signal strength in resource areas in an S-DCH for a dormant mode BS, and recognizes a small BS that operates in a dormant mode exists in a nearby region when an S-DS of which a signal strength is greater than or equal to a predetermined threshold value, is detected.

However, the UE may not know a frequency band of a CC used by the dormant mode small BS. To this end, the UE 1005 obtains a dormant BS index from the received S-DS, and transfers the same to the macro BS 1001 in operation 1021. For reference, the UE 1005 is aware of the mapping relationship between detailed areas 1111 to 1114 of the S-DCH 1110 for the dormant mode BS and dormant BS indices and, thus, may recognize an area through which the received S-DS of operation 1019 is obtained, and may obtain a dormant BS index based on the same.

The macro BS 1001 that receives the dormant BS index from the UE 1005 may determine that the new UE 1005 enters the coverage of the small BS 1003, and may instruct, through a backhaul network, the small BS 1003 that currently operates in a dormant mode to enter an active mode in operation 1023. Accordingly, the small BS 1003 enters an active mode in operation 1025. Entry into an active mode indicates that the small BS 1003 itself selects a CC to be used by the small BS 1003, and prepares the execution of communication in the selected CC. A method for a small BS to select a CC, as described in the first embodiment, may be used as a method of selecting a CC. However, depending on cases, a predetermined CC, which is set as a default, may be used.

Subsequently, the small BS 1003 transfers the dormant BS index that was allocated to the small BS 1003 itself, and selected CC information, to the macro BS 1001, in operation 1027. The reason that the small BS 1003 transfers the dormant BS index is to enable the dormant BS index that was allocated to the small BS 1003 to be allocated to another small BS that newly enters a dormant mode, since the small BS 1003 is no longer a dormant BS. That is, the small BS 1003 returns the dormant BS index.

In operation 1029, the macro BS 1001 transfers, to the UE 1005, CC information of the small BS 1003 through a downlink signaling of the f0 band. This is to report the information associated with the CC selected by the small BS 1003, to the UE 1005 that is aware of the existence of the small BS 1003, so as to enable the UE 1005 to communication with the small BS 1003 in a frequency band of the corresponding CC.

In operation 1031, the UE 1005 receives a reference signal and a control signal, and executes a cell association procedure, so as to execute communication with the small BS 1003 in the corresponding CC frequency band based on the CC information. In this instance, the UE 1005 may put off the execution of the cell association procedure during a predetermined period of time until the small BS 1003 is capable of starting operation in an active mode, and transmitting reference signals used for the cell association.

The descriptions of FIG. 10 have been provided by assuming that a single code is used when an S-DS is generated, as described in FIG. 5. When it is configured to use an orthogonal code having a different value from one another when an S-DS is generated, as described in FIG. 6, a resource for generating an S-DS in FIG. 10 may be changed into an orthogonal code. Accordingly, an orthogonal code for an S-DS of a dormant mode small BS may be used in addition to an orthogonal code for an S-DS generated by an active mode small BS. Also, the additional orthogonal code may be mapped to a dormant BS index. Except for the above points, the above descriptions of FIG. 10 may be applied as they are.

That is, the small BS 1003 that is assigned with the dormant BS index "1" generates an S-DS using an orthogonal code corresponding to the index "1", inserts the generated S-DS into a resource area that is identical to an S-DCH for an S-DS of the active mode small BS, and transmits the same. As described in the first embodiment, when S-DSs are generated using different orthogonal codes, transmission resources, through which the S-DSs are transmitted, are identical.

In the same manner, the small BS 1003 generates an S-DS using an additional orthogonal code for a dormant BS, and transmits the same in a resource area that is identical to an S-DCH resource area for an S-DS generated by the active mode small BS.

The UE 1005 may detect an S-DS from the S-DCH using an additional candidate orthogonal code for the dormant mode small BS, and accordingly, may recognize that the dormant mode small BS 1003 that is assigned with the index "1" exists in a nearby region.

Third Embodiment

The first embodiment is a case in which an S-DS indicates CC information, and the second embodiment is a case in which an S-DS indicates a dormant BS index. According to the third embodiment, an S-DS indicates a CID configuration information index that may be used for configuring a CID of a small BS.

In the first embodiment, a UE detects an S-DS so as to obtain CC information used by an adjacent BS, and executes a search through a frequency band (fk) of the corresponding CC information so as to obtain a CID using a reference signal and a control signal transmitted by the corresponding adjacent BS in the fk band. For example, in the existing LTE system, a CID of a small BS may be obtained using a first synchronization signal (PSS) and a secondary PSS of the small BS.

In the third embodiment of the present disclosure, a UE uses a transmission resource of an f0 band to enable an S-DS to indicate information that may configure a part of a CID. In the third embodiment of the present disclosure, information that may configure a part of the CID is referred to as "cell identification (CID) configuration information", and an S-DS indicates an index of the CID configuration information. A method of generating and transferring an S-DS that indicates the CID configuration information index may use a single code or orthogonal codes having different values according to the first and the second embodiment of the present disclosure.

That is, when a CID configuration index is configured using a single code as described in FIG. 5, each CID configuration information index may be mapped to a location of an S-DCH where an S-DS is inserted, and thereby being distinguished. Therefore, a UE obtains the CID configuration information index from the DS using location information of an S-DS for each CID configuration information index, which is provided in advance from a macro BS.

Conversely, when a CID configuration information index is configured using an orthogonal code having a different value for one another, each CID configuration information index may be mapped by a different orthogonal code, and may be thereby distinguished. Therefore, a UE obtains the CID configuration information index using the mapping relationship between CID configuration information indices and orthogonal codes, and S-DS location information, which are provided in advance from a macro BS.

According to the third embodiment of the present disclosure, when it is assumed that a total of L CID configuration information indices are used, the number of CIDs may be increased to be L times greater than the number of CIDs used in the existing LTE system. Table 1 as provided below shows that (504 X L) CIDs may be generated by combining CID configuration information indices and the existing PSSs and SSSs, when L pieces of CID configuration information are assumed. That is, in the existing LTE system, a total of 504 CID indices (D) may be generated using a PSS index (A) and an SSS index (C). According to the third embodiment of the present disclosure, a CID configuration information index (A) is additionally used, and thus, a total of 504 X L CID indices may be generated.

macro BS through a backhaul network, and transfer the same to the S-DS generating unit 1205.

When an S-DS is generated using a single code as described in FIG. 5, an S-DS for each CC may be transmitted through a transmission resource of an S-DS corresponding to a corresponding CC. In this instance, CC-based S-DS location information may be provided from the macro BS in advance to the controller 1203 through a backhaul network. Also, a location of an S-DS for each CC may be fixed to a predetermined location, or may be determined to be different for each macro BS using a CID of a macro BS as a function. When an S-DS is generated using an orthogonal code having a different value for each CC, as described in FIG. 6, a location where an S-DS is inserted for each CC may be identical. In this instance, the controller 1203 may obtain the CC-based code information and the S-DS location information in advance from the macro BS through the backhaul network. Also, a CC-based orthogonal code may be fixed to a predetermined orthogonal code, or may be determined to be different for each macro BS using a CID of a macro BS as a function.

The S-DS generating unit 1205 generates an S-DS corresponding to the CC selected by the controller 1203, and transmits the generated S-DS using an S-DCH transmission resource of the f0 band, based on the CC-based S-DS location information (FIG. 5) or CC-based code information and S-DS location information (FIG. 6), which is transferred from the controller 1203.

TABLE 1

| CID configuration information index(A) | PSS index(B) | SSS index(C) | CID index(D) |
|---|---|---|---|
| 1 | 1 | 1, 2, . . . , 167, 168 | 1, 2, . . . , 167, 168 |
| 2 | 1, 2, . . . , 167, 168 | 169, 170, . . . , 335, 336 | |
| 3 | 1, 2, . . . , 167, 168 | 337, 338, . . . , 503, 504 | |
| 2 | 1 | 1, 2, . . . , 167, 168 | 505, 506, . . . , 671, 672 |
| 2 | 1, 2, . . . , 167, 168 | 673, 674, . . . , 839, 840 | |
| 3 | 1, 2, . . . , 167, 168 | 841, 842, . . . , 1007, 1008 | |
| . . . | . . . | . . . | . . . |
| L | 1 | 1, 2, . . . , 167, 168 | 504(L − 1) + 1, . . . , 504(L − 1) + 168 |
| 2 | 1, 2, . . . , 167, 168 | 504(L − 1) + 169, . . . , 504(L − 1) + 336 | |
| 3 | 1, 2, . . . , 167, 168 | 504(L − 1) + 337, . . . , 504L | |

Hereinafter, configurations of a small BS and a UE according to embodiments of the present disclosure will be described.

Figure 12:
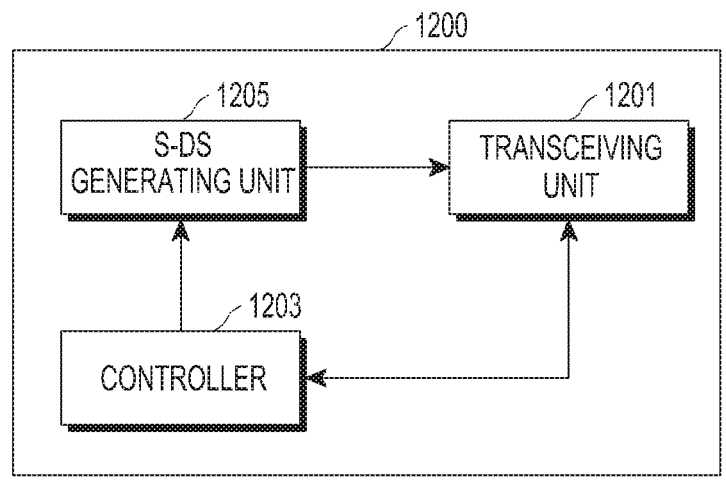
FIG. 12 is a diagram illustrating a configuration of another small BS according to various embodiments of the present disclosure.

FIG. 12 is a diagram illustrating a configuration of another small BS according to various embodiments of the present disclosure.

From the perspective of the first embodiment, the operations of a small BS 1200 will be described first.

The small BS 1200 includes a transceiving unit 1201, a controller 1203, and an S-DS generating unit 1205.

The transceiving unit 1201 includes an RF unit to execute the transmission and reception of a signal with a macro BS and a UE, in an f0 band.

The controller 1203 selects at least one CC out of N available CCs, and transmits the same to the S-DS generating unit 1205. As described in FIG. 4, only one CC may be selected out of the selected CCs by taking into consideration a traffic load of each CC, information associated with whether an adjacent small BS uses a CC, or the like.

Also, the controller 1203 may receive CC-based S-DS location information (FIG. 5) or CC-based code information and S-DS location information (FIG. 6), in advance from a From the perspective of the second embodiment, the operations of the small BS 1200 will be described.

In the second embodiment, when the controller 1203 determines that a UE does not exist in the cell coverage of the small BS 1200 during a predetermined period of time, the small BS 1200 enters a dormant mode, and the controller 1203 generates a dormant mode entry message indicating that the small BS 1200 enters the dormant mode and reports the same to a macro BS through the transceiving unit 1201.

Subsequently, when a dormant BS index is received from the macro BS, the controller 1203 transfers the dormant BS index to the S-DS generating unit 1205 and instructs the generation of information that indicates a dormant mode small BS. The S-DS generating unit 1205 generates an S-DS for reporting that the small BS 1200 is a dormant small BS, and transmits the same through the transceiving unit 1201. Except for the above, a scheme of generating an S-DS and a transmitted resource are identical to the descriptions in the first embodiment, and thus, the descriptions thereof will be omitted.

From the perspective of the third embodiment, the operations of the small BS 1200 will be described.

In the third embodiment, the controller 1203 transfers a CID configuration information index associated with a CID of the small BS 1200 using an S-DS, and transfers, to the S-DS generating unit 1205, S-DS location information for each CID configuration information index (FIG. 5) or orthogonal code information for each CID configuration information index and S-DS location information (FIG. 6), and the S-DS generating unit 1205 generates an S-DS under the control of the controller 1203 and transmits the same through the transceiving unit 1201. Other configurations are identical to the first embodiment.

Figure 13:
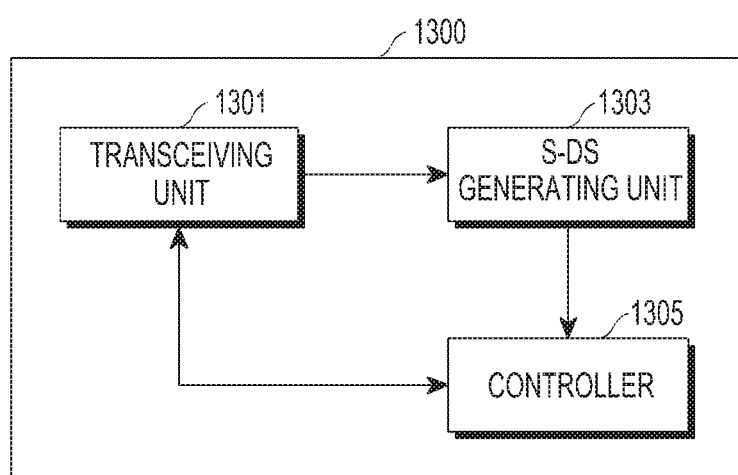
FIG. 13 is a diagram illustrating a UE according to various embodiments of the present disclosure.
Figure 14:
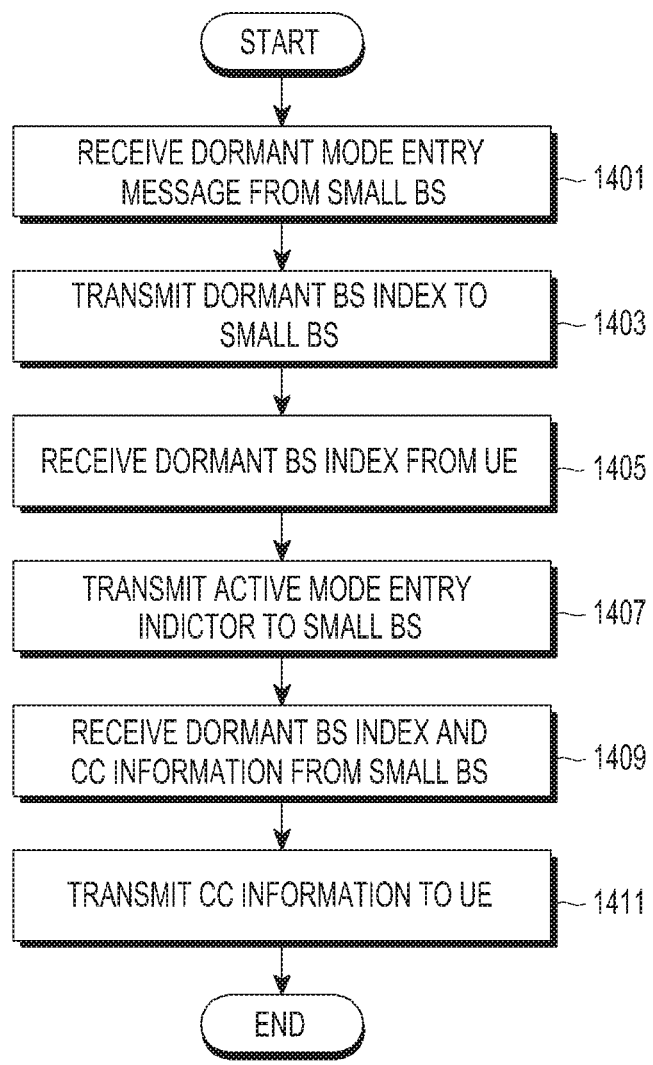
FIG. 14 is a diagram illustrating a method of a macro BS according to a second embodiment of the present disclosure.

FIG. 13 is a diagram illustrating a UE according to various embodiments of the present disclosure.

From the perspective of the first embodiment, the operations of a UE 1300 will be described.

A transceiving unit 1301 executes a search through a transmission resource of an f0 band which is a CC resource of a macro BS, for example, a predetermined area on a PDSCH of LTE, and receives an S-DCH including an S-DS.

When an S-DS is generated using a single code as described in FIG. 5, an S-DS for each CC may be received through a transmission resource of an S-DS corresponding to a corresponding CC, in an S-DCH. In this instance, CC-based S-DS location information may be provided from a macro BS in advance to a UE through a broadcasting message or a control message. Also, the location of an S-DS for each CC may be fixed to a predetermined location, or may be determined to be different for each macro BS using a CID of a macro BS as a function. When an S-DS is generated using an orthogonal code having a different value for each CC, as described in FIG. 6, a location of an S-DCH where an S-DS is inserted for each CC may be identical. In this instance, the CC-based code information and the location information of an S-DS may be obtained in advance from a macro BS through a broadcasting message or a control message. Also, a CC-based orthogonal code may be fixed to a predetermined orthogonal code, or may be determined to be different for each macro BS using a CID of a macro BS as a function.

An S-DS detecting unit 1303 measures the strength of a signal included in the S-DCH area, and detects an S-DS having a reception signal strength that is greater than or equal to a predetermined threshold value. When a small BS generates an S-DS using a single code as described in FIG. 5, the S-DS detecting unit measures the strength of a reception signal in each of N S-DS transmission areas included in the S-DCH area. Conversely, when the small BS generates an S-DS using an orthogonal code having a different value from one another, as described in FIG. 6, the S-DS detecting unit 1303 measures a correlation value between a signal received in the identical S-DCH area and each of N candidate orthogonal codes corresponding to N CCs. Subsequently, the S-DS detecting unit 1303 detects a reception signal (that is, S-DS) that is greater than or equal to a threshold value.

A controller 1305 obtains CC information using CC-based S-DS location information (FIG. 5) or CC-based code information (FIG. 6) that corresponds to the detected S-DS. A frequency band (fk) corresponding to the obtained CC information is activated and communication with a corresponding small BS is executed. That is, the communication with the corresponding small BS is executed by receiving a reference signal and a control signal transmitted by the small BS in the fk band.

From the perspective of the second embodiment, the operations of the UE 1300 will be described.

The S-DS detecting unit 1303 measures the reception signal strength in the resource areas of an S-DCH for a dormant mode BS, and detects an S-DS of which the signal strength is greater than or equal to a predetermined threshold value.

The controller 1305 obtains a dormant BS index from the detected S-DS, and transfers the same to a macro BS. For reference, the controller 1305 receives the mapping relationship between detailed areas of the S-DCH for a dormant mode BS and dormant BS indices, in advance from the macro BS, and may recognize an area where the received S-DS is obtained and may obtain the dormant BS index based on the same.

Also, the controller 1305 receives CC information used by the dormant mode small BS, from the macro BS, activates the corresponding CC frequency band (fk) based on the corresponding CC information, receives a reference signal and a control signal from the small BS, and executes a cell association procedure. Other configurations are identical to the first embodiment.

From the perspective of the third embodiment, the operations of the UE 1300 will be described.

In the third embodiment, the transceiving unit 1301 executes a search through a transmission resource of an f0 band, which is a CC resource of the macro BS, for example, a predetermined area on a PDSCH of LTE, and receives an S-DCH including an S-DS.

When an S-DS is generated using a single code as described in FIG. 5, an S-DS for each CID configuration information index may be received through a transmission resource of an S-DS corresponding to a corresponding CID configuration information index, in an S-DCH. In this instance, S-DS location information for each CID configuration information index may be provided from the macro BS in advance to the controller 1305 through a broadcasting message or a control message. Also, S-DS location information for each CID configuration information index may be fixed to a predetermined location, or may be determined to be different for each macro BS using a CID of a macro BS as a function. When an S-DS is generated using an orthogonal code having a different value from one another, as described in FIG. 6, a location of an S-DCH where an S-DS is inserted for each CID configuration information index may be identical.

In this instance, the orthogonal code information for each CID configuration information index and the S-DS location information may be obtained in advance from the macro BS through a broadcasting message or a control message. Also, an orthogonal code for each CID configuration information index may be fixed to a predetermined orthogonal code, or may be determined to be different for each macro BS using a CID of a macro BS as a function.

The S-DS detecting unit 1303 measures the strength of a signal included in the S-DCH area, and detects an S-DS having a reception signal strength that is greater than or equal to a predetermined threshold value. When an S-DS is generated using a single code as described in FIG. 5, the S-DS detecting unit 1303 measures the strength of a reception signal in each of L S-DS transmission areas included in the S-DCH area. Conversely, when an S-DS is generated using an orthogonal code that has a different value from one another, as described in FIG. 6, the S-DS detecting unit 1303 measures a correlation value between a signal received in the identical S-DCH area and each of L candidate orthogonal codes corresponding to L CID configuration information indices. Subsequently, the S-DS detecting unit 1303 detects a reception signal (that is, S-DS) that is greater than or equal to a threshold value.

The controller 1305 obtains a CID configuration information index from the detected S-DS, using S-DS location information for each CID configuration information index (FIG. 5) or orthogonal code information for each CID configuration information index and S-DS location information (FIG. 6). Also, the obtained CID configuration information index may be used when a CID is generated. That is, a PSS and an SSS are received through the communication with a small BS, and a CID of the corresponding small BS is generated.

Hereinafter, the operations of a macro BS, according to the second embodiment of the present disclosure, will be described.

In operation 1401, the macro BS receives a dormant mode entry message from a small BS. In operation 1403, the macro BS transmits a dormant BS index to the small BS. In a state in which a predetermined number of dormant BS indices are set, a subsequent dormant BS index is transmitted for a subsequent small BS that enters a dormant mode. The dormant BS index may be generated before or after the reception of the dormant mode entry message.

In operation 1405, the macro BS receives a dormant BS index from a UE. This is a dormant BS index that the UE obtains from an S-DS that a small BS generates and transmits. When the macro BS receives the dormant BS index from the UE, the macro BS recognizes that a new UE enters the coverage of the small BS. Accordingly, the macro BS generates and transfers an active mode entry message to the small BS so as to instruct the small BS to enter an active mode in operation 1407. Subsequently, in operation 1409, the macro BS receives, from the small BS that enters the active mode, the dormant BS index and CC information used by the corresponding small BS. In operation 1411, the macro BS transmits the received CC information to the UE, so as to enable the UE to execute communication with the small BS in the corresponding CC frequency band.

Figure 15:
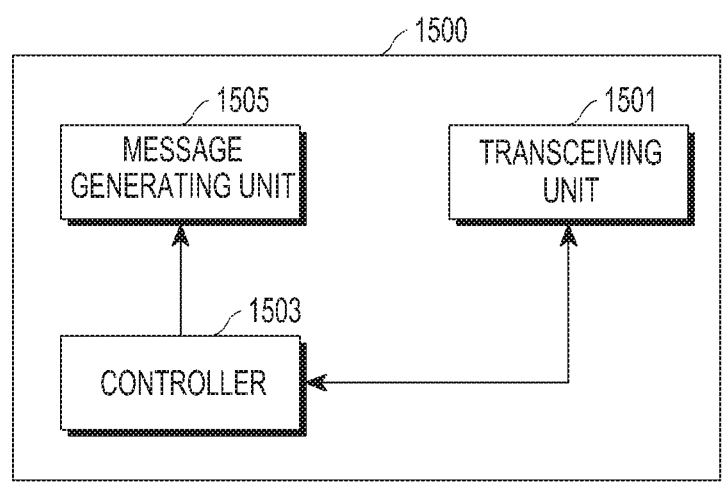
FIG. 15 is a diagram illustrating a macro BS according to a second embodiment of the present disclosure.

FIG. 15 is a diagram illustrating a macro BS 1500 according to a second embodiment of the present disclosure.

A transceiving unit 1501 receives a dormant mode entry message from a small BS, and transfers the same to a controller 1503.

The controller 1503 instructs a message generating unit 1505 to generate a dormant BS index so as to instruct the small BS to enter a dormant mode.

The message generating unit 1505 generates a dormant BS index to be allocated to a small BS according to a sequence of an index, and transmits the same through the transceiving unit 1501. When the controller 1503 receives the dormant BS index from the UE through the transceiving unit 1501, the controller 1503 determines that a new UE enters the coverage of the small BS and instructs the message generating unit 1505 to generate an active mode entry message. The message generating unit 1505 generates the active mode entry message under the control of the controller 1503, and transfers the same to the small BS through the transceiving unit 1501.

Subsequently, when the controller 1503 receives a dormant BS index and CC information used by a corresponding small BS from the small BS that enters the active mode, the controller 1503 reserves the dormant BS index for a subsequent dormant BS, and transmits the received CC information to the UE so as to enable the UE to execute communication with the small BS in the corresponding CC frequency band.

The embodiments of the present disclosure have been described in detail. According to the present disclosure, a discovery signal generated by a small BS is transmitted using a transmission resource of a macro BS. In this instance, information used for the communication between the small BS and a UE may be included in the discovery signal. Through the above, a UE may not waste power to execute a search through a frequency band of the small BS, and the UE promptly obtains information associated with the small BS, and thus, a delay time caused by searching for the small BS may be reduced.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for communication by a secondary base station (BS) in a mobile communication system including a master BS and the secondary BS, the method comprising:
transmitting, to the master BS, a first message indicating the secondary BS enters a dormant mode;
selecting at least one frequency band from a plurality of frequency bands based on a traffic load for each of the plurality of frequency bands;
transmitting, to a terminal through a discovery channel (DCH) dedicated to the dormant mode, a discovery signal corresponding to the at least one frequency band selected by the secondary BS;
receiving, from the master BS, a second message requesting entry into an active mode in case that the terminal detects the discovery signal;
transmitting, to the master BS, a third message including information related to the at least one frequency band selected by the secondary BS in response to the second message, wherein a fourth message including the information related to the at least one frequency band selected by the secondary BS is transmitted from the master BS to the terminal; and
communicating with the terminal based on the information related to the at least one frequency band selected by the secondary BS.

2. The method of claim 1,
wherein the discovery signal is generated by using a single predetermined code or a predetermined number of orthogonal codes having different values.

3. The method of claim 2,
wherein, when the discovery signal is generated using the single predetermined code, the DCH includes N transmission areas that are mapped respectively to N carrier frequency values.

4. The method of claim 2,
wherein, when the discovery signal is generated using the predetermined number of orthogonal codes, the orthogonal codes are formed of N orthogonal codes that are mapped respectively to N carrier frequency information values, and
wherein the DCH includes a single transmission area for the transmission of the discovery signal, and the discovery signal is transmitted to the terminal through the single transmission area for the transmission of the discovery signal.

5. The method of claim 2,
wherein, when the discovery signal is generated using the single predetermined code, the DCH includes L transmission areas that are mapped respectively to L cell ID (CID) configuration information index values, and wherein the discovery signal is transmitted through a transmission area that is mapped to a CID configuration information index value corresponding to the discovery signal.

6. The method of claim 2, wherein, when the discovery signal is generated using the predetermined number of orthogonal codes, the orthogonal codes are formed of L orthogonal codes that are mapped respectively to L cell ID (CID) configuration information index values, wherein the DCH includes a single transmission area for the transmission of the discovery signal, and wherein the discovery signal is transmitted through the single transmission area for the transmission of the discovery signal, irrespective of the CID configuration information index value.

7. The method of claim 2, wherein a DCH area is determined based on DCH location information that is transferred in advance from the master BS, and wherein the DCH location information is fixed to a predetermined area from among transmission resources of the master BS or is determined based on a CID of the master BS.

8. An apparatus of a secondary base station (BS) for communicating in a mobile communication system including a master BS and the secondary BS, the apparatus comprising:

a transceiver; and a processor coupled with the transceiver and configured to control to:

transmit, to the master BS, a first message indicating the secondary BS enters a dormant mode, select at least one frequency band from a plurality of frequency bands based on a traffic load for each of the plurality of frequency bands, transmit, to a terminal through a discovery channel (DCH) dedicated to the dormant mode, a discovery signal corresponding to the at least one frequency band selected by the secondary BS, receiving, from the master BS, a second message requesting entry into an active mode in case that the terminal detects the discovery signal, transmit, to the master BS, a third message including information related to the at least one frequency band selected by the secondary BS in response to the second message, wherein a fourth message including the information related to the at least one frequency band selected by the secondary BS is transmitted from the master BS to the terminal, and communicate with the terminal based on the information related to the at least one frequency band selected by the secondary BS.

9. The apparatus of claim 8, wherein the discovery signal is generated by using a single predetermined code or a predetermined number of orthogonal codes having different values.

10. The apparatus of claim 9, wherein, when the discovery signal is generated using the single predetermined code, the DCH includes N transmission areas that are mapped respectively to N carrier frequency values.

11. The apparatus of claim 9, wherein, when the discovery signal is generated using the predetermined number of orthogonal codes, the orthogonal codes are formed of N orthogonal codes that are mapped respectively to N carrier frequency information values, and wherein the DCH includes a single transmission area for the transmission of the discovery signal, and the discovery signal is transmitted to the terminal through the single transmission area for the transmission of the discovery signal.

12. The apparatus of claim 9, wherein, when the discovery signal is generated using the single predetermined code, the DCH includes L transmission areas that are mapped respectively to L cell ID (CID) configuration information index values, and wherein the discovery signal is transmitted through a transmission area that is mapped to a CID configuration information index value corresponding to the discovery signal.

13. The apparatus of claim 9, wherein, when the discovery signal is generated using the predetermined number of orthogonal codes, the orthogonal codes are formed of L orthogonal codes that are mapped respectively to L cell ID (CID) configuration information index values, wherein the DCH includes a single transmission area for the transmission of the discovery signal, and wherein the discovery signal is transmitted through the single transmission area for the transmission of the discovery signal, irrespective of the CID configuration information index value.

14. The apparatus of claim 9, wherein a DCH area is determined based on DCH location information that is transferred in advance from the master BS, and wherein the DCH location information is fixed to a predetermined area from among transmission resources of the master BS or is determined based on a CID of the master BS.

15. A method for communication by a master base station (BS) in a mobile communication system including the master BS and a secondary BS, the method comprising:

receiving, from the secondary BS, a first message indicating the secondary BS enters a dormant mode;

transmitting, to the secondary BS, a second message requesting entry into an active mode in case that a terminal detects a discovery signal transmitted from the secondary BS;

receiving, from the secondary BS, a third message including information related to at least one frequency band selected by the secondary BS, wherein the at least one frequency band is selected from a plurality of frequency bands based on a traffic load for each of the plurality of frequency bands; and transmitting, to the terminal, a fourth message including the information related to the at least one frequency band selected by the secondary BS, wherein the discovery signal corresponding to the at least one frequency band selected by the secondary BS is transmitted from the secondary BS to the terminal through a discovery channel (DCH) dedicated to the dormant mode, and wherein a communication between the secondary BS and the terminal is performed based on the information related to the at least one frequency band selected by the secondary BS.

16. An apparatus of a master base station (BS) for communicating in a mobile communication system including the master BS and a secondary BS, the apparatus comprising:

a transceiver; and a processor coupled with the transceiver and configured to control to:

receive, from the secondary BS, a first message indicating the secondary BS enters a dormant mode, transmit, to the secondary BS, a second message requesting entry into an active mode in case that a terminal detects a discovery signal transmitted from the secondary BS, receive, from the secondary BS, a third message including information related to at least one frequency band selected by the secondary BS, wherein the at least one frequency band is selected from a plurality of frequency bands based on a traffic load for each of the plurality of frequency bands and transmit, to the terminal, a fourth message including the information related to the at least one frequency band selected by the secondary BS, wherein the discovery signal corresponding to the at least one frequency band selected by the secondary BS is transmitted from the secondary BS to the terminal through a discovery channel (DCH) dedicated to the dormant mode, and wherein a communication between the secondary BS and the terminal is performed based on the information related to the at least one frequency band selected by the secondary BS.

\* \* \* \* \*